(12) United States Patent
Barber et al.

(10) Patent No.: US 11,337,484 B2
(45) Date of Patent: May 24, 2022

(54) HEADSET AND HEADSET COUPLING SYSTEM

(71) Applicant: Gentex Corporation, Simpson, PA (US)

(72) Inventors: Ross Fade Barber, Auburn, NH (US); Zoltan S. Brutler, Groton, MA (US); Michael Pearson Blundell, Windham, NH (US)

(73) Assignee: GENTEX CORPORATION, Simpson, PA (US)

( * ) Notice: Subject to any disclaimer, the term of this patent is extended or adjusted under 35 U.S.C. 154(b) by 0 days.

(21) Appl. No.: 17/053,641

(22) PCT Filed: May 17, 2019

(86) PCT No.: PCT/US2019/032877
§ 371 (c)(1),
(2) Date: Nov. 6, 2020

(87) PCT Pub. No.: WO2019/222631
PCT Pub. Date: Nov. 21, 2019

(65) Prior Publication Data
US 2021/0186140 A1     Jun. 24, 2021

Related U.S. Application Data

(60) Provisional application No. 62/673,560, filed on May 18, 2018.

(51) Int. Cl.
*H04R 1/10*     (2006.01)
*A42B 3/30*     (2006.01)
(Continued)

(52) U.S. Cl.
CPC ............... *A42B 3/306* (2013.01); *A42B 1/24* (2013.01); *H04R 1/08* (2013.01); *H04R 1/105* (2013.01); *H04R 2201/023* (2013.01)

(58) Field of Classification Search
CPC ...... H04R 1/10; H04R 1/1008; H04R 1/1041; H04R 1/105; H04R 1/1058; H04R 1/1066;
(Continued)

(56) References Cited

U.S. PATENT DOCUMENTS 3,167,619 A    1/1965   Palmaer
3,586,977 A    6/1971   Lustig
(Continued)

FOREIGN PATENT DOCUMENTS

JP     2013157739 A    8/2013
WO    2010068495 A2    6/2010

OTHER PUBLICATIONS

Australian Examination Report No. 1 dated Jul. 26, 2021 for Australian Patent Application No. 2019269664, 8 pages.
(Continued)

*Primary Examiner* — Thang V Tran
(74) *Attorney, Agent, or Firm* — Morgan, Lewis & Bockius LLP

(57) ABSTRACT

A communication accessory may include an ear cup configured to at least one of send and receive an audio communication. The ear cup may be detachably coupleable to a first accessory coupling system configured to couple to a helmet and a second accessory coupling system configured to couple to a headband.

23 Claims, 42 Drawing Sheets

(51) Int. Cl.
*A42B 1/24* (2021.01)
*H04R 1/08* (2006.01)

(58) Field of Classification Search
CPC ........ H04R 1/1075; H04R 1/08; H04R 5/033; H04R 5/0335; H04R 25/00; H04R 2201/023; A42B 3/30; A42B 3/306; A42B 1/24
See application file for complete search history.

(56) References Cited

U.S. PATENT DOCUMENTS

| | | |
|---|---|---|
| 2004/0261158 A1 | 12/2004 | Depew et al. |
| 2006/0147052 A1 | 7/2006 | Wikel et al. |
| 2006/0212998 A1 | 9/2006 | Gath |
| 2008/0092278 A1 | 4/2008 | Rogers |
| 2010/0158265 A1* | 6/2010 | Riese ................... H04R 5/0335 381/74 |
| 2016/0007112 A1 | 1/2016 | Broadley et al. |
| 2016/0143385 A1 | 5/2016 | Krissman et al. |
| 2016/0324248 A1 | 11/2016 | Winters et al. |
| 2017/0257696 A1 | 9/2017 | Hoernschemeyer |
| 2018/0139539 A1 | 5/2018 | Zimmer |
| 2018/0332919 A1* | 11/2018 | Garcia Mansilla .. H04R 5/0335 |
| 2019/0320753 A1* | 10/2019 | Le ......................... H04R 1/105 |

OTHER PUBLICATIONS

International Search Report and Written Opinion dated Aug. 2, 2019 for International Patent Application No. PCT/US2019/032877, 9 pages.

* cited by examiner

HEADSET AND HEADSET COUPLING SYSTEM

CROSS REFERENCE TO RELATED APPLICATIONS

This application is a U.S. National Phase of International Application No. PCT/US2019/032877 filed on May 17, 2019, which claims the benefit of U.S. Provisional Patent Application No. 62/673,560 filed May 18, 2018 entitled "Headset and Headset Coupling System", each of which is incorporated by reference herein in its entirety.

FIELD OF THE INVENTION

The present invention generally relates to an accessory coupling system for a helmet or headband mounted headset.

BRIEF SUMMARY OF THE INVENTION

A communication accessory may include an ear cup configured to at least one of send and receive an audio communication. The ear cup may be detachably coupleable to a first accessory coupling system configured to couple to a helmet and a second accessory coupling system configured to couple to a headband.

The ear cup may detachably couple and decouple from the first accessory coupling system and the second accessory coupling system without tools. The ear cup may include a pair of indents on diametrically opposed sides of the ear cup. In a further embodiment, the communication accessory includes a harness coupled to the ear cup and extending across a front surface of the ear cup. The harness may detachably couple the ear cup to the first accessory coupling system and the second accessory coupling system. The ear cup may include a pair of indents on diametrically opposed sides of the ear cup and the harness may include protrusions positionable in the pair of indents. The harness may be fixed relative to the front surface of the ear cup.

In a further embodiment, the communication accessory includes an electrical connector wire electrically coupled to the ear cup and the harness may be detachable from the ear cup while the electrical connector remains electrically coupled to the ear cup.

In a further embodiment, the communication accessory includes the first accessory coupling system and the first accessory coupling system may be configured to detachably couple the ear cup to a mounting feature on an exterior of the helmet. The first accessory coupling system may include a connector configured to moveably couple to the mounting feature, and a base coupled to the connector, the base configured to rotate about a first axis relative to the connector between a use position and a storage position. The base may be configured to prevent movement of the connector when the base is in the use position and allow movement of the connector when the base is rotated out of the use position.

An attachment arm may be coupled to the base and the attachment arm may be configured to rotate about a second axis relative to the base. The first accessory coupling system may include a biasing member configured to bias the attachment arm about the second axis. The first accessory coupling system may include a harness coupled to the attachment arm and the harness may be configured to detachably couple to the ear cup. In a further embodiment, the first accessory coupling system includes an intermediate member coupled to the base, the intermediate member including a channel configured to movably receive a portion of the attachment arm. Movement of the attachment arm within the channel relative to the intermediate member may change a distance between the ear cup and the base. One of the attachment arm and the intermediate member may include a recess and the other of the attachment arm and the intermediate member may include a protrusion configured to be positioned in the recess to at least temporarily fix the position of the intermediate member relative to the attachment arm.

The base may include a first flange and a second flange, and the intermediate member may be coupled to the base between the first flange and the second flange. At least one of the first flange and the second flange may include a boss configured to limit rotation of the intermediate member relative to the base. The connector may include a protrusion configured to be positioned in a recess of the mounting feature thereby fixing the position of the connector relative to the mounting feature. The connector may include a latch and the protrusion may be spring biased into the recess by the latch. Movement of the latch may disengage the protrusion from the recess and the base may prevent movement of the latch when the base may be in the use position.

The harness may be rotatable about a third axis relative to the attachment arm, the third axis being transverse to at least one of the first axis and the second axis. In a further embodiment, the communication accessory includes the mounting feature coupled to the connector. The mounting feature may include a dovetail channel with at least a portion of the dovetail channel positioned on the helmet behind the wearer's ear. The connector may include a dovetail shape configured to mount in the dovetail channel.

The second accessory coupling system may include the headband, a cover, a frame, and a harness. The headband may be configured to extend from a first side of a wearer's head to a second side of a wearer's head. The cover may be detachably coupled to the headband. The frame may be rotatably coupled to the headband. The harness may be rotatably coupled to the frame and configured to detachably couple to the ear cup. The second accessory coupling system may include a sleeve coupled to the harness, the sleeve including a pocket to receive at least a portion of the frame. The sleeve may be rotatable relative to the frame.

The ear cup may include a first port configured to electrically connect a microphone to the ear cup. The communication accessory may include the microphone electrically connected to the first port, and the microphone may be detachably coupled to the first port. The microphone may be coupled to and decoupled from the first port without tools. The ear cup may be a first ear cup and the communication accessory may include a second ear cup including a microphone port. The microphone may be detached from the first port of the first ear cup and electrically connected to the microphone port of the second ear cup without tools. The communication accessory may include a second port configured to electrically couple to a wire electrically coupled to a second ear cup. The second port may be configured to detachably electrically couple to the wire. The communication accessory may include a third port configured to electrically couple to an external electrical device. The third port may be configured to detachably electrically couple to the external electrical device. The ear cup may include an ear cup pad having a liquid proof barrier and a membrane in an opening of the liquid proof barrier, the membrane may be configured to allow gas flow through the membrane and configured to prevent liquid flow through the membrane.

In a further embodiment, a communication accessory comprises an ear cup configured to at least one of send and receive an audio communication, the ear cup detachably coupleable to a first accessory coupling and a second accessory coupling system. The first accessory coupling system may include a connector, a base, an attachment arm coupled to the base, and a harness coupled to the attachment arm. The connector may be configured to couple to a mounting feature on a helmet. The base may be coupled to the connector and configured to rotate about a first axis relative to the connector between a use position and a storage position. The attachment arm may be configured to rotate about a second axis relative to the base. The harness may be configured to detachably couple to the ear cup. The second accessory coupling system may include a headband, a cover, a frame, and a harness. The headband may be configured to extend from a first side of a wearer's head to a second side of a wearer's head. The cover may be detachably coupled to the headband. The frame may be rotatably coupled to the headband. The harness may be rotatably coupled to the frame and configured to detachably couple to the ear cup.

BRIEF DESCRIPTION OF THE SEVERAL VIEWS OF THE DRAWINGS

The following detailed description of embodiments of the accessory coupling system will be better understood when read in conjunction with the appended drawings of an exemplary embodiment. It should be understood, however, that the invention is not limited to the precise arrangements and instrumentalities shown. For example, although not expressly stated herein, features of one or more various disclosed embodiments may be incorporated into other of the disclosed embodiments.

In the drawings.

DETAILED DESCRIPTION OF THE EXEMPLARY EMBODIMENTS OF THE INVENTION

Figure 1:
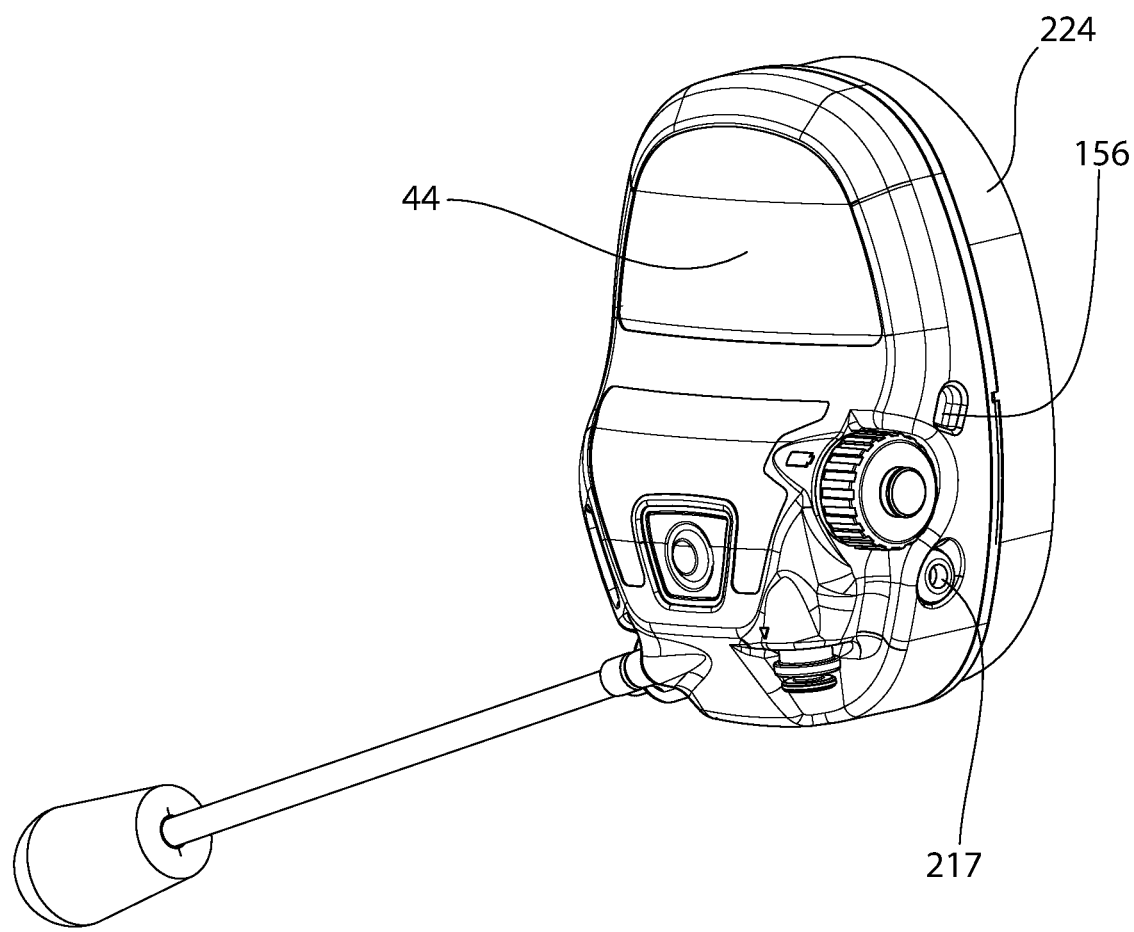
FIG. 1 is a rear, left-side perspective view of an ear cup in accordance with an exemplary embodiment of the present invention.

Referring to the drawings in detail, wherein like reference numerals indicate like elements throughout, there is shown in FIGS. 3-33 an accessory coupling system 40 for a helmet mounted headset, in accordance with an exemplary embodiment of the present invention.

Ear accessories (e.g., communications devices integrated within a padded earphone or ear cup) can be critical in helmet deployments; for example, the need for both protection and communication is particularly important for defense forces, emergency responders, and industrial personnel operating in high performance environments. Ear accessories traditionally have been built into the helmet or worn separately beneath the helmet. An example of a helmet with built-in earphones is the present military helmet known as the Combat Vehicle Crew 25 (CVC) helmet. Unfortunately, because the earphones add weight, do not function in dismounted operations, and cannot be removed from the CVC helmet, the vehicle crew members are issued two helmets—the CVC helmet and a standard infantry helmet. Other helmets having a mounted headset lack the functionality and performance of the helmet mounted headset disclosed herein.

Figure 2:
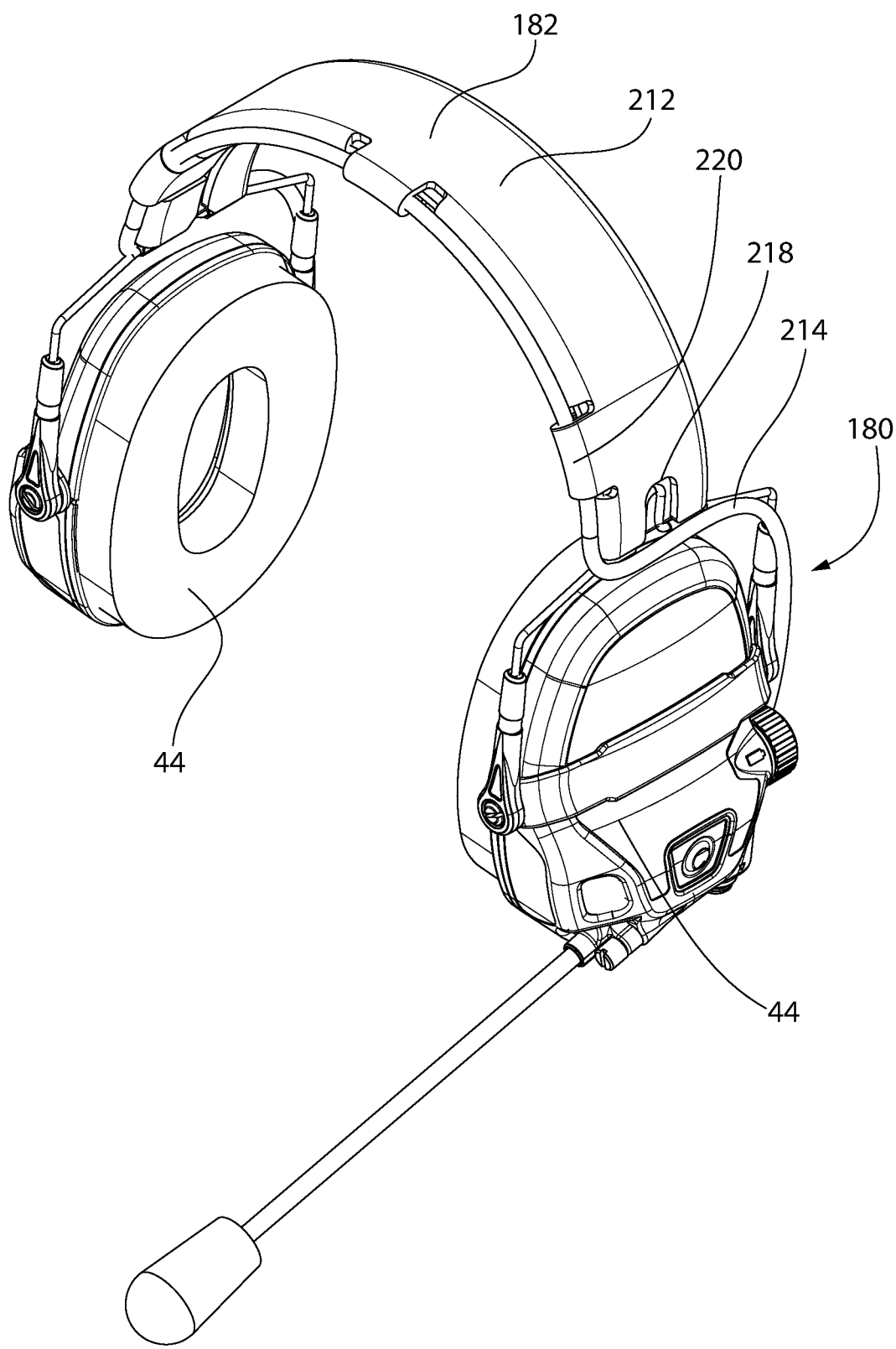
FIG. 2 is a top, left-side perspective view of the ear cup of FIG. 1 coupled to an accessory coupling system in accordance with an exemplary embodiment of the present invention.
Figure 3:
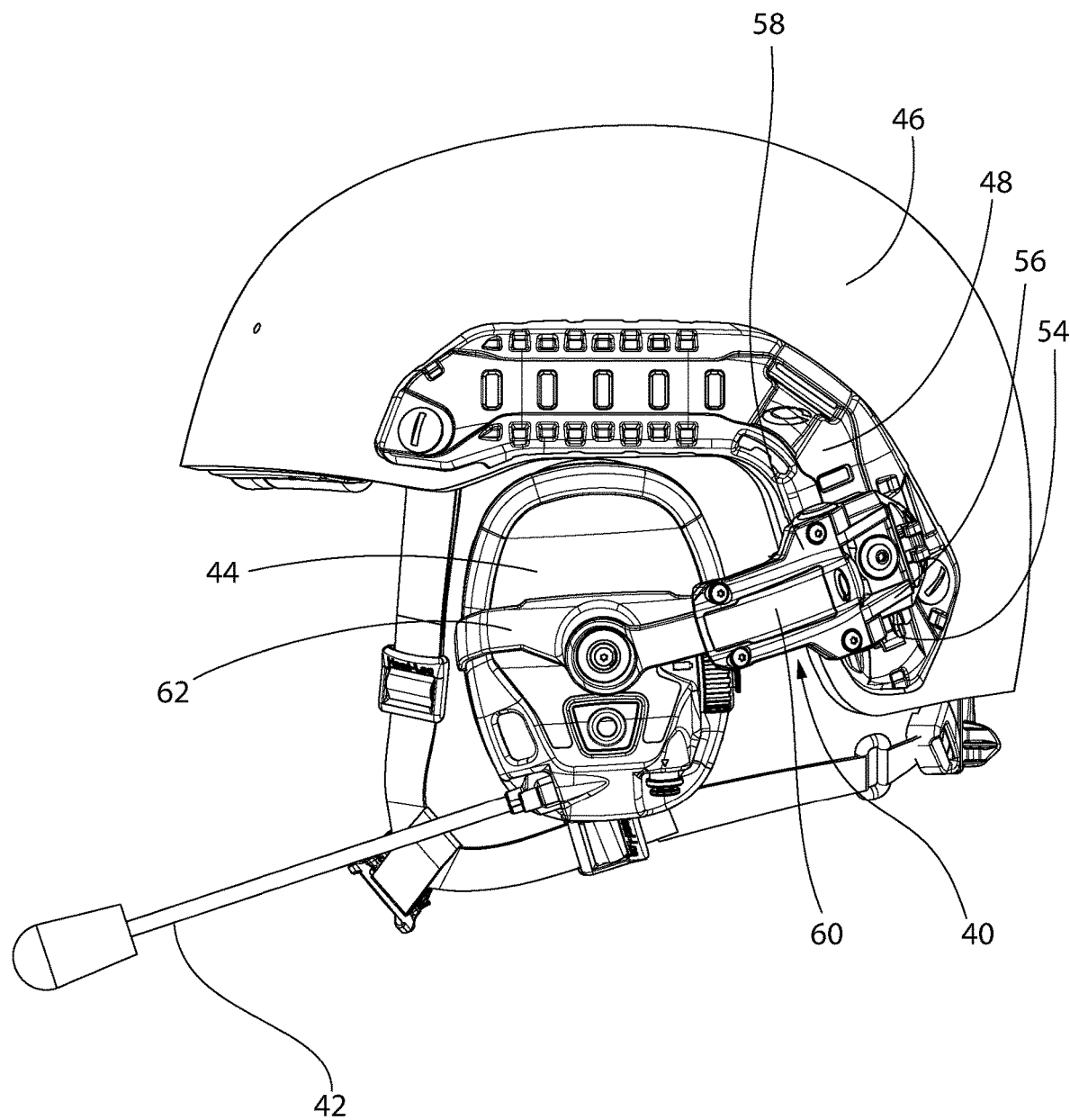
FIG. 3 is a left-side elevational view of the ear cup of FIG. 1 coupled to an accessory coupling system in accordance with an exemplary embodiment of the present invention coupled to a helmet.

Referring to FIGS. 1-3, an ear cup 44 may be provided that is configured to be attached to more than one mounting device for holding the ear cup 44 in a desired position relative to a user's ear to provide the user with different mounting options. For example, the ear cup 44 may be coupled to either of accessory coupling system 40 and accessory coupling system 180 as shown. Accessory coupling system 40 may couple the ear cup 44 to a helmet 46. Accessory coupling system 180 may couple the ear cup 44 to a headband 182. The ear cup 44 may be decoupled from one of accessory coupling system 40 and accessory coupling system 180 and coupled to the other of accessory coupling system 40 and accessory coupling system 180. The ear cup 44 may be coupled or decoupled from accessory coupling system 40 and accessory coupling system 180 without the use of tools. The ear cup 44 may couple to the coupling system 40/180 by a selective and temporary connection such as a snap fit connection discussed in further detail below. Providing an easily releasable attachment may allow for the ear cup 44 to be coupled or decoupled from accessory coupling system 40 and accessory coupling system 180.

Figure 6:
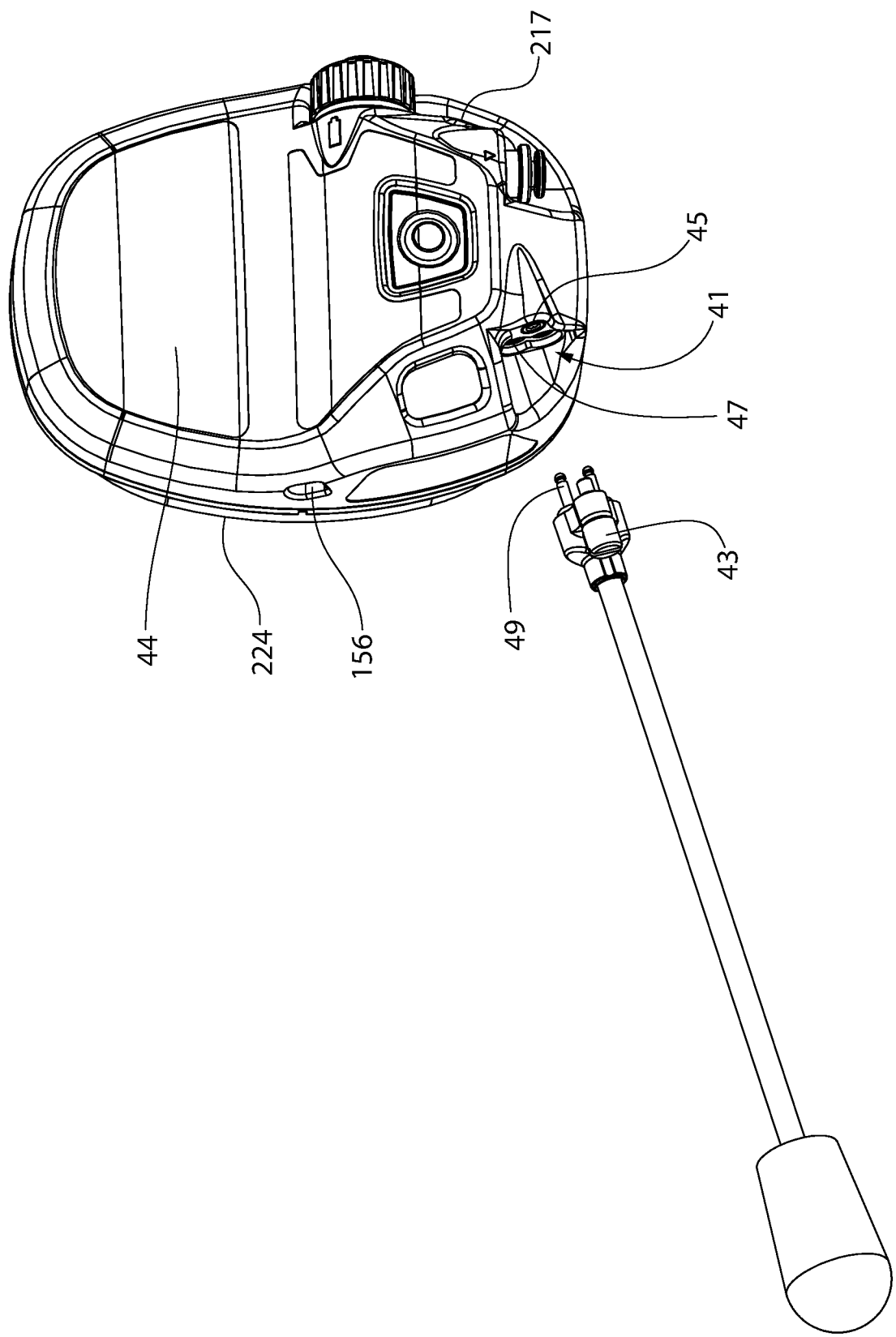
FIG. 6 is a left-side elevational view of the ear cup of FIG. 1 with the microphone detached.
Figure 33:
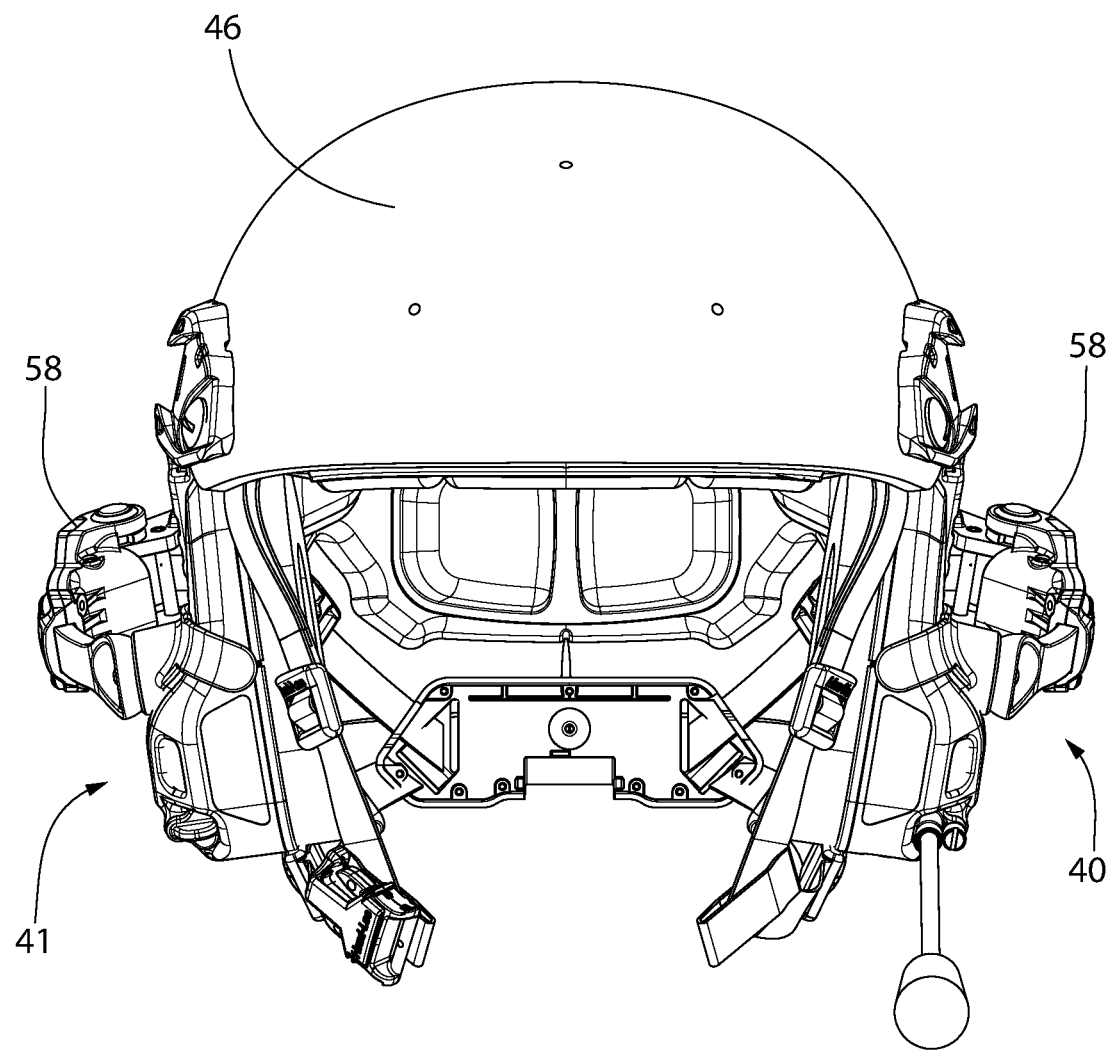
FIG. 33 is a front elevational view of the accessory coupling system of FIG. 3 coupled to a helmet.
Figure 34:
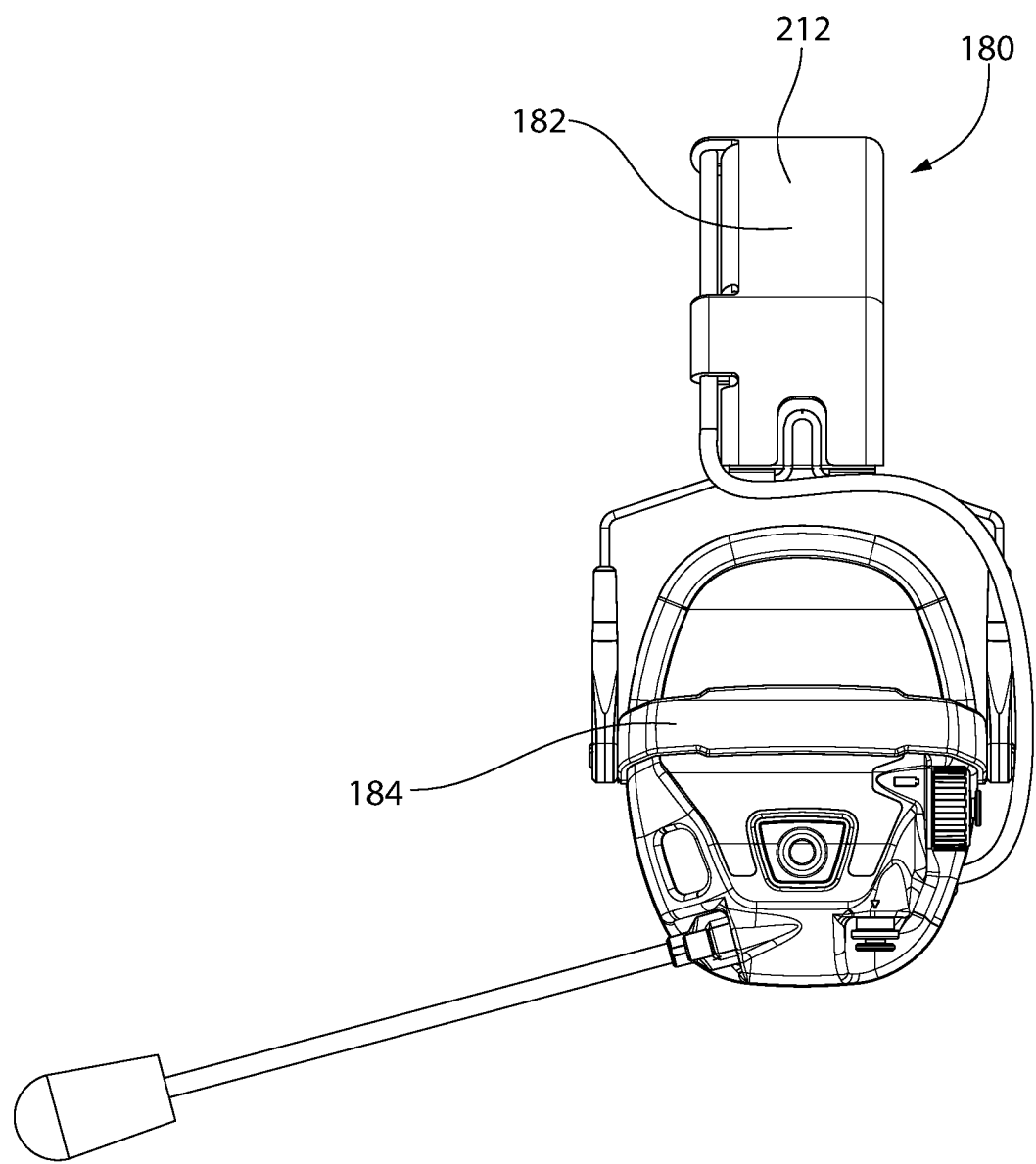
FIG. 34 is a left-side elevational view of the ear cup of FIG. 1 coupled to an accessory coupling system in accordance with another exemplary embodiment of the present invention.

Referring to FIGS. 3, 6, and 33, a second accessory coupling system 41 may be mounted to the other lateral side of the helmet 46 in a mirrored configuration to the illustrated accessory coupling system 40. The pair of accessory coupling systems may be mirror configurations of one another except for certain details of the ear cups such as microphone 42. The accessory coupling system 40 may be provided to consumers in pairs or individually. In some embodiments, the ear cup 44 and/or mounting feature are provided with the accessory coupling system 40 as a kit. In some embodiments, the ear cup 44 and/or mounting feature are provided separately such that the accessory coupling system 40 is unattached to other components in the system.

Figure 27:
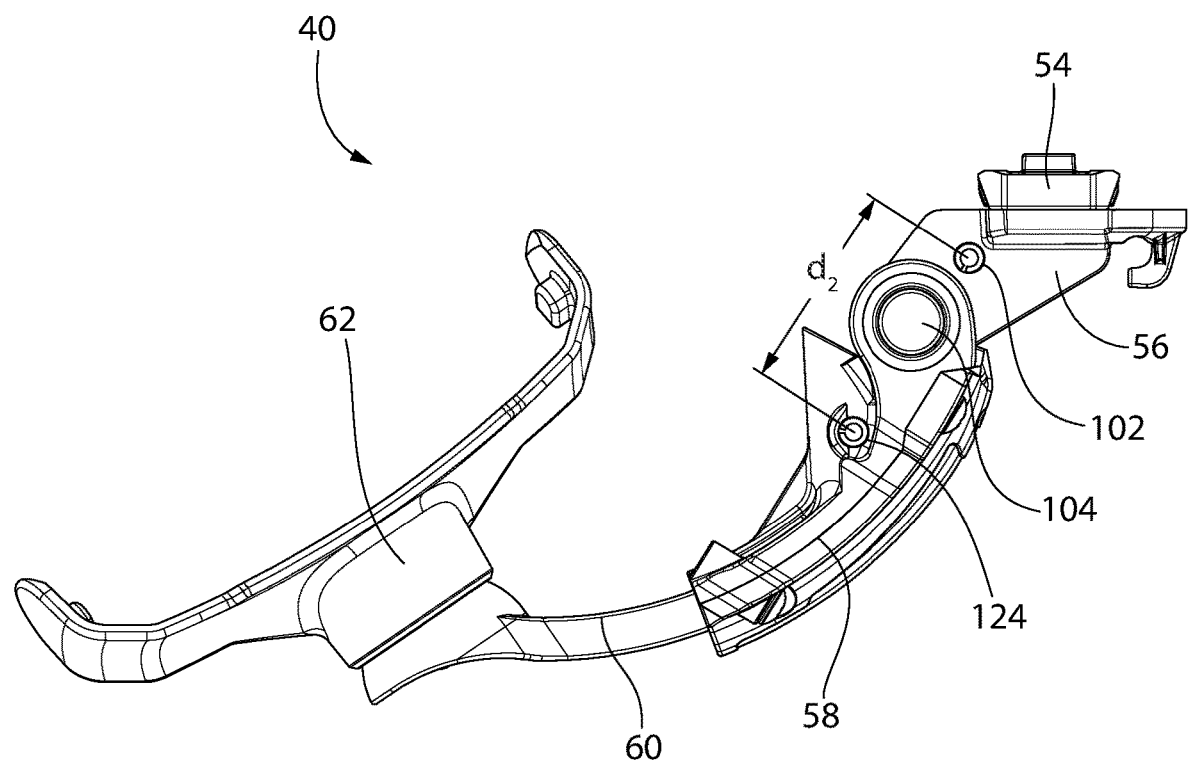
FIG. 27 is top plan view of the accessory coupling system of FIG. 3 in a second position.
Figure 28:
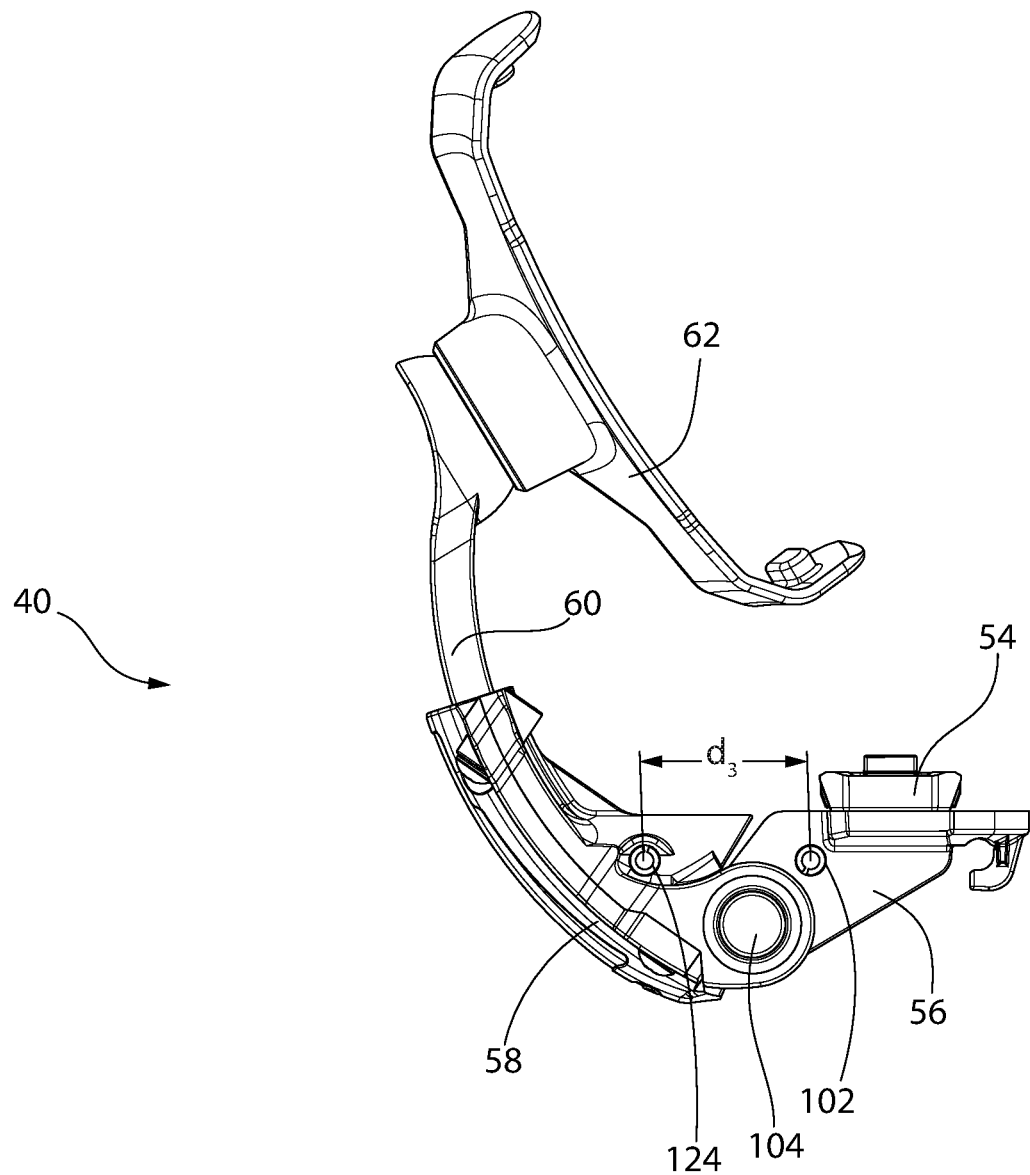
FIG. 28 is top plan view of the accessory coupling system of FIG. 3 in a third position.
Figure 29:
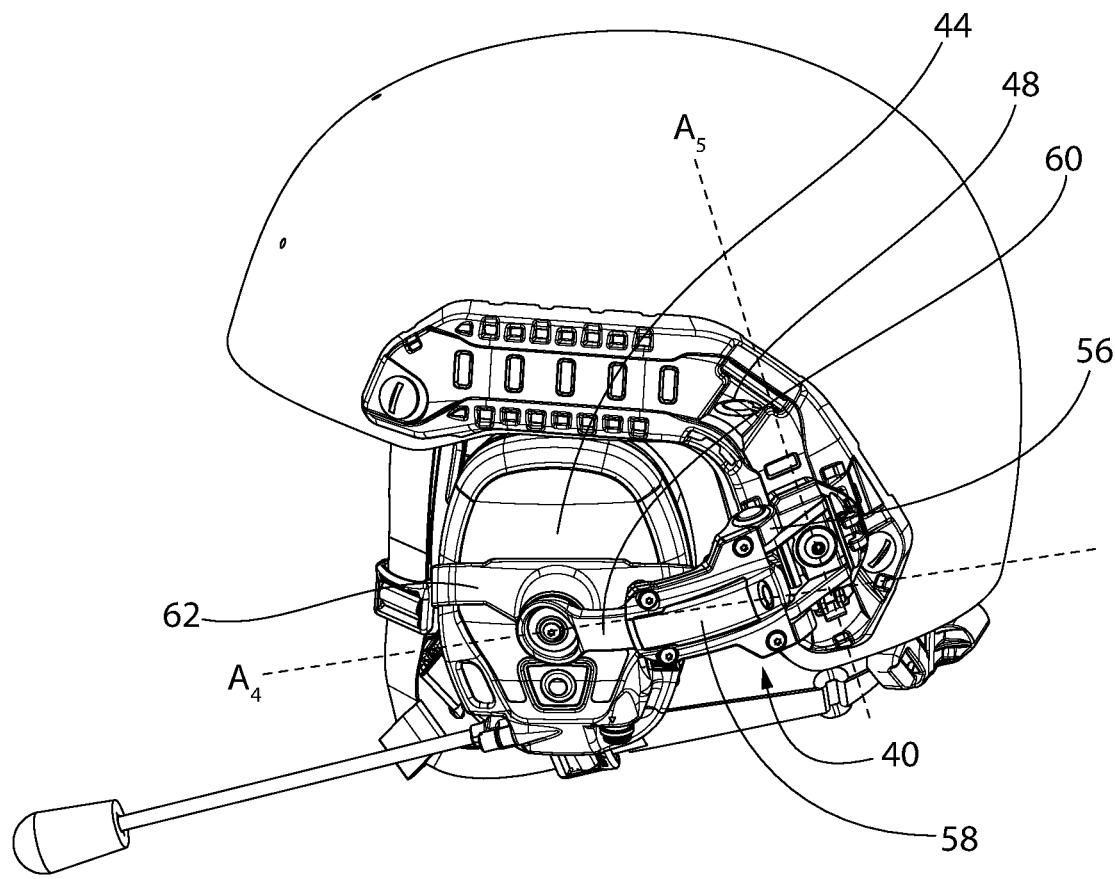
FIG. 29 is a left-side elevational view of the accessory coupling system of FIG. 3 coupled to a helmet with the accessory coupling system in a use position.
Figure 30:
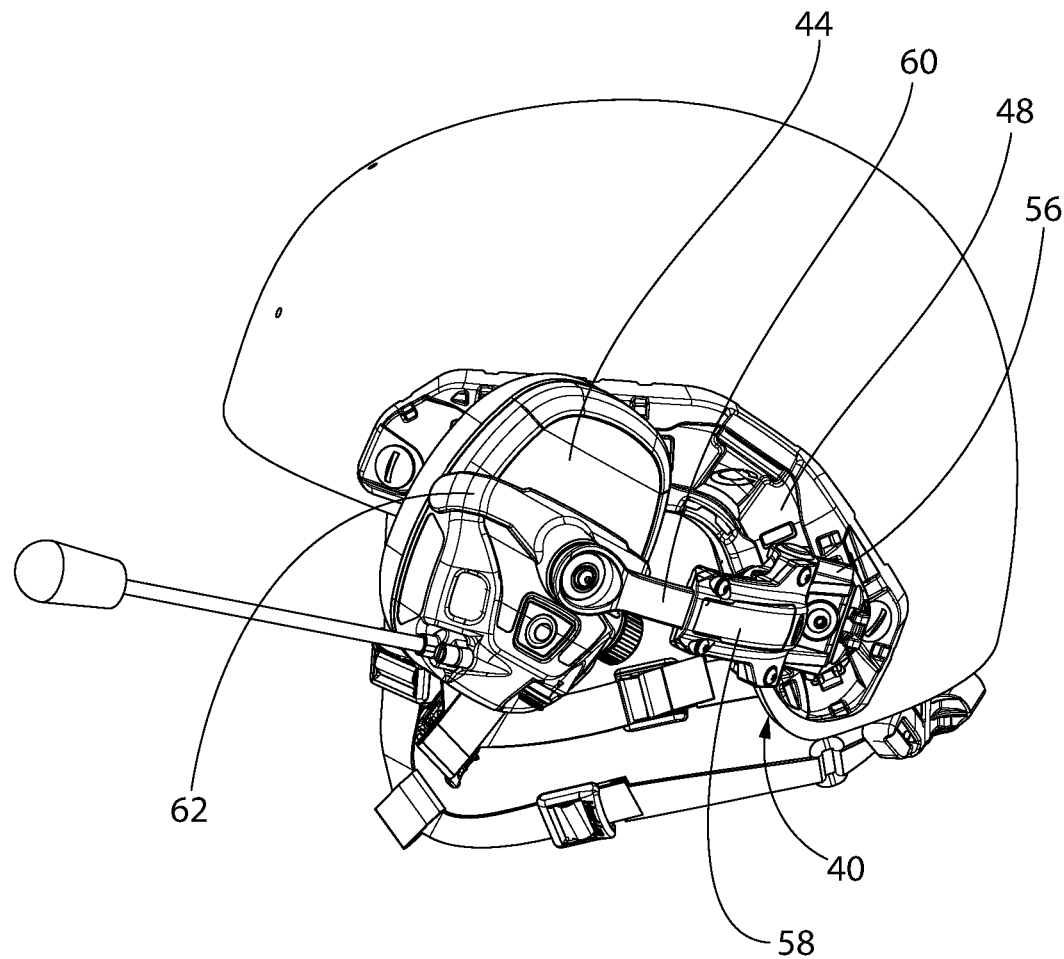
FIG. 30 is a left-side elevational view of the accessory coupling system of FIG. 3 coupled to a helmet with the accessory coupling system in an intermediate position.
Figure 31:
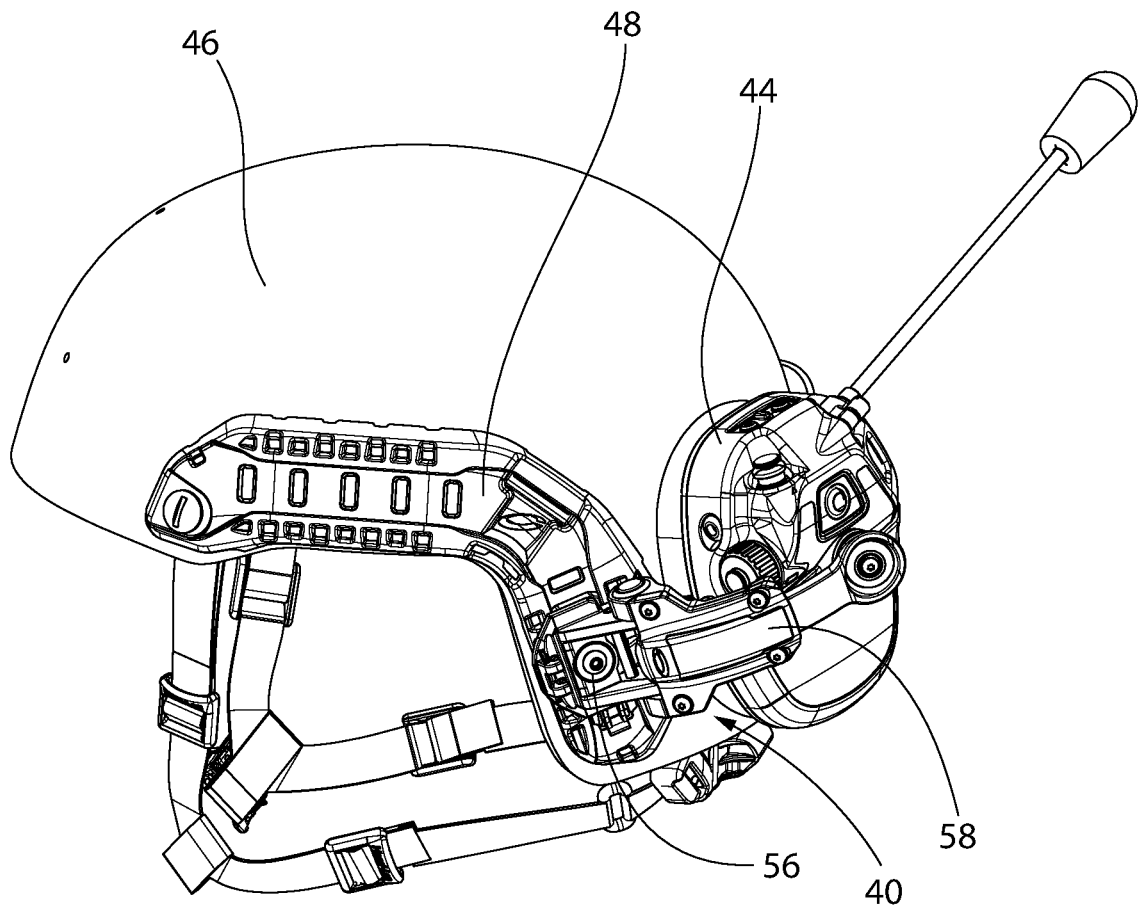
FIG. 31 is a left-side elevational view of the accessory coupling system of FIG. 3 coupled to a helmet with the accessory coupling system in a storage position.

Referring to FIGS. 29-31, at least a portion of the accessory coupling system 40 may be moveable relative to the helmet 46 such that the ear cup 44 can be moved between a use position (FIG. 26), an intermediate position (FIG. 27), and a storage position (FIG. 28). The ear cup 44 may also be moved (e.g., rotated) to any position between the use position and the storage position. The accessory coupling system 40 may allow the ear cup 44 to be moved fore and aft relative to the helmet 46. In some embodiments, the ear cup 44 may be moved fore and aft relative to the helmet 46 along a linear axis A4 (e.g., without rotating). The ear cup 44 may be moved along a linear axis toward the front of a user's head or toward the back of a user's head when the user is wearing the helmet. The accessory coupling system 40 may allow the ear cup 44 to be moved up and down along axis A5. In some embodiments, the ear cup 44 may be moveable up and down along a linear axis (e.g., without rotating). The ear cup 44 may be moveable along a linear axis toward the top of a user's head or away from the top of the user's head when the user is wearing the helmet. The accessory coupling system 40 may be detachably coupled to the helmet 46. In some embodiments, a user may detach the accessory coupling system 40 from the helmet 46 without removing the helmet.

Figure 4:
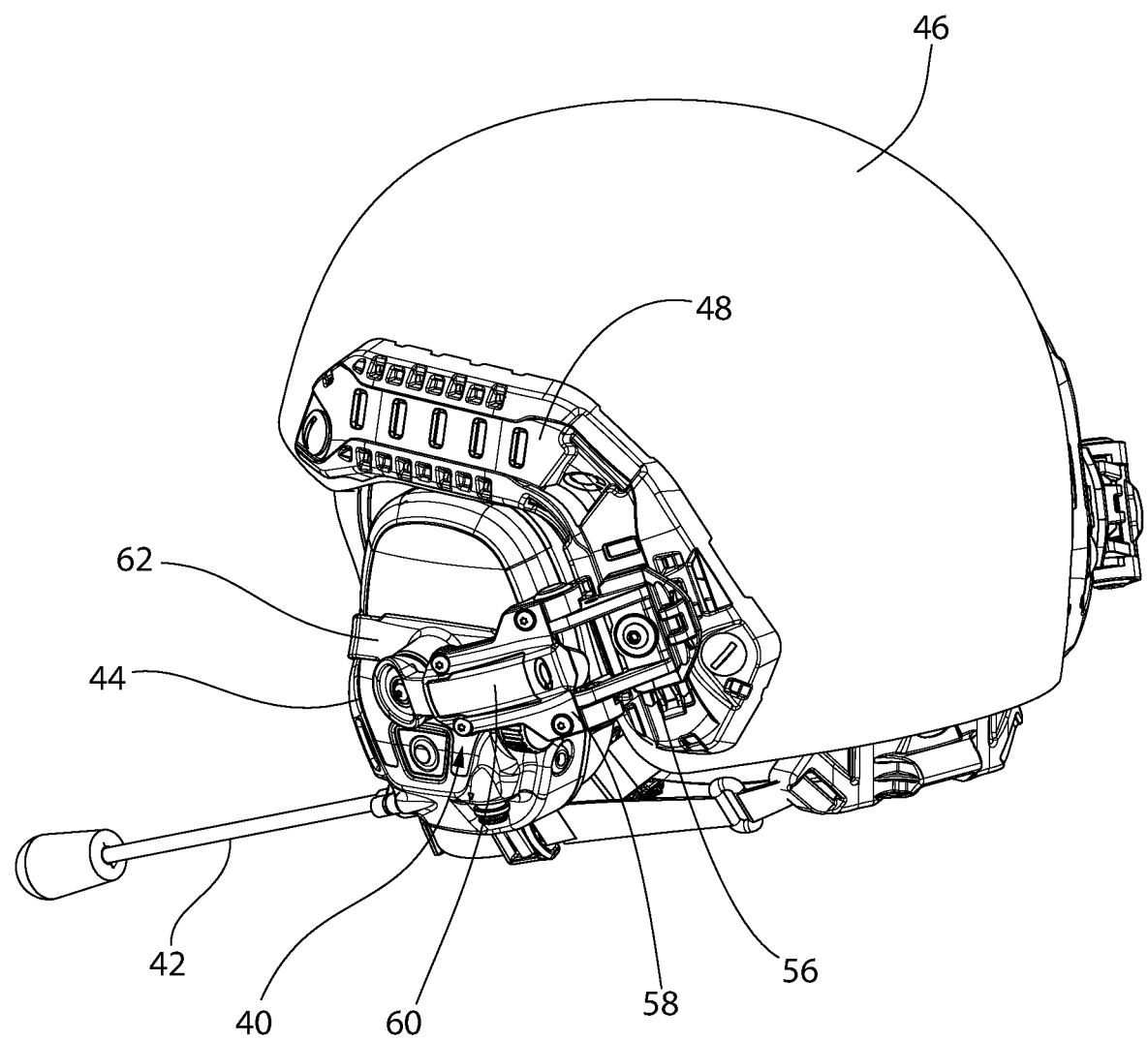
FIG. 4 is a rear, left-side perspective view of the ear cup and accessory coupling system of FIG. 3 coupled to the helmet in a first position.
Figure 5:
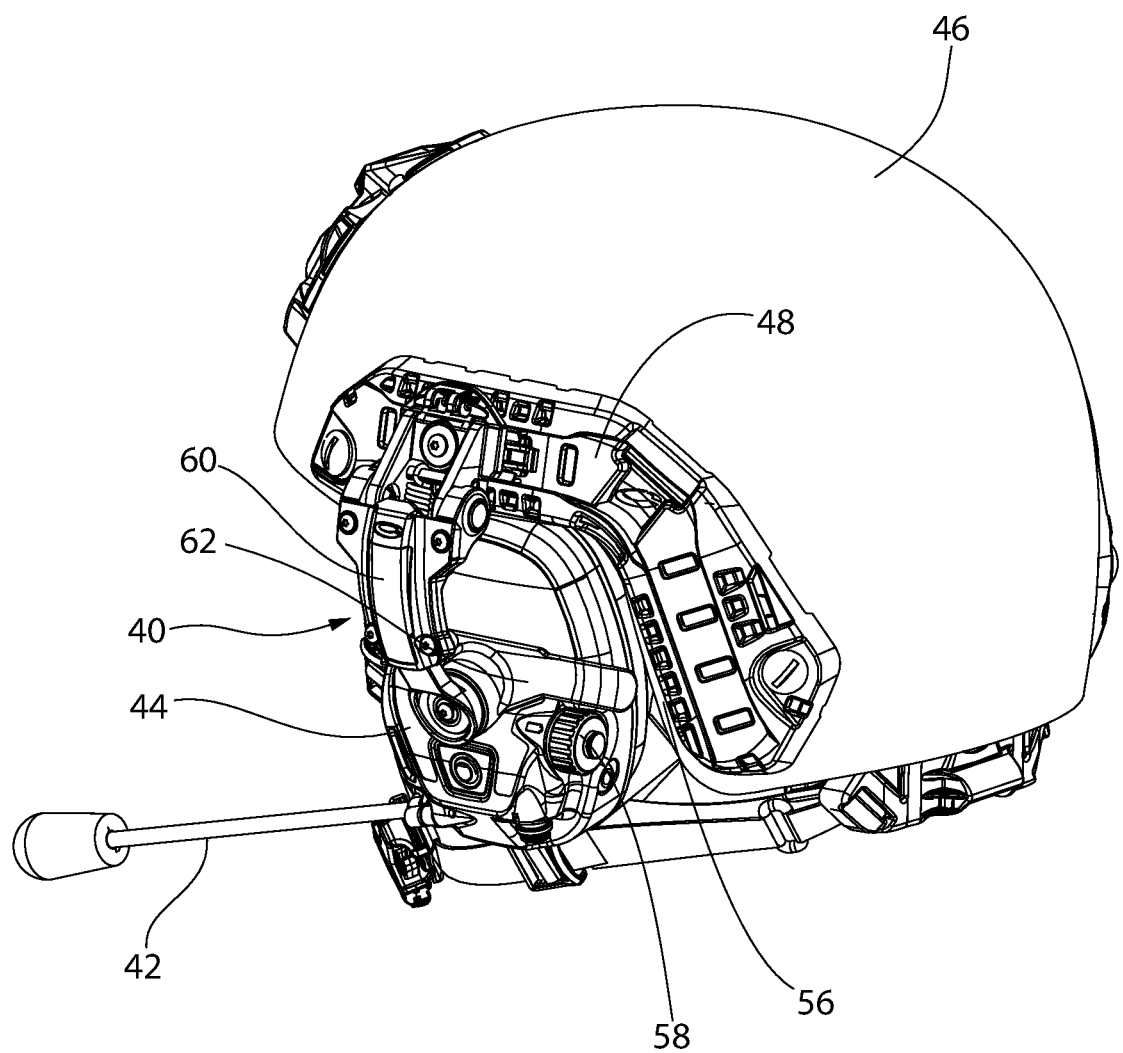
FIG. 5 is a rear, left-side perspective view of the ear cup and accessory coupling system of FIG. 3 coupled to the helmet in a second position.
Figure 7:
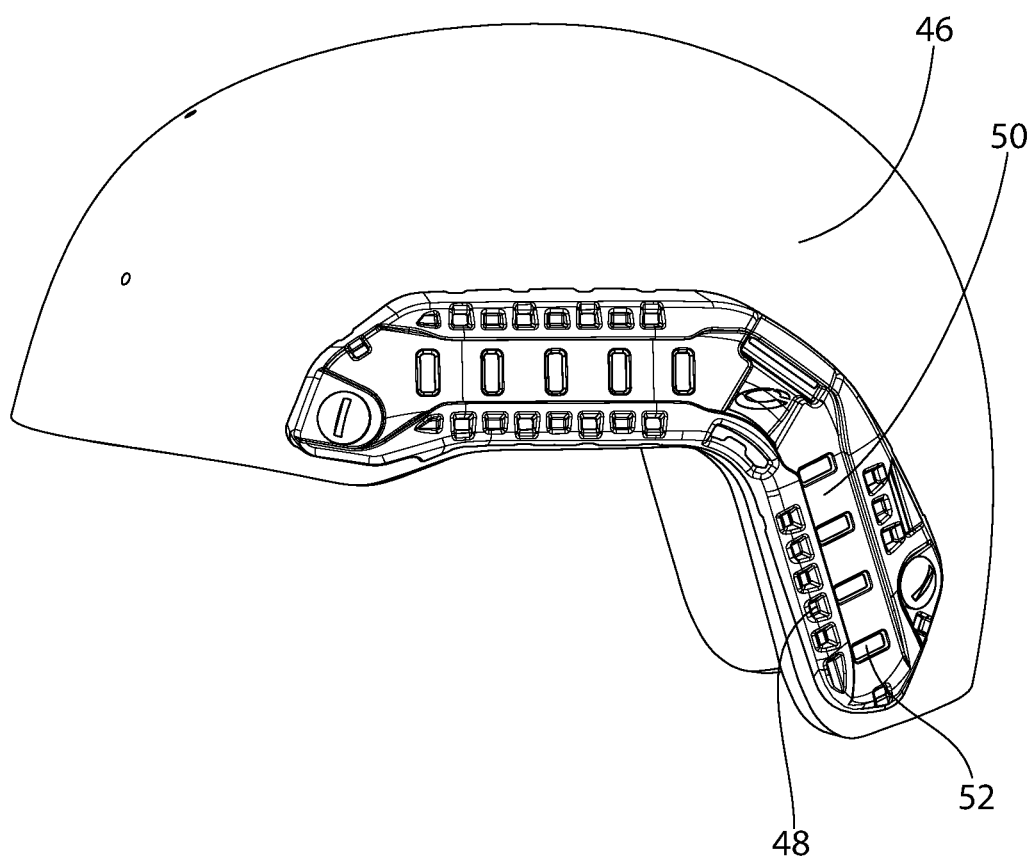
FIG. 7 is a left-side elevational view of the helmet of FIG. 3.

Referring to FIGS. 4, 5, and 7, the helmet 46 may include a mounting feature or rail 48. Some embodiments of rails contemplated for use with the present invention are described in international patent application no. PCT/US18/22221 and U.S. Pat. No. 7,849,517, the disclosure of each of which is hereby incorporated by reference in its entirety. One type of mounting rail contemplated for use are Ops-Core Accessory Rail Connectors (ARC Rails). The rail 48 may include a channel 50 configured to receive a connector on the accessory coupling system 40. The channel 50 may include one or more recesses 52 that further couple to the accessory coupling system 40, as explained in greater detail below. The accessory coupling system 40 may be coupled along a first portion of the rail 48 (FIG. 4) or along a second portion of the rail (FIG. 5).

Figure 8:
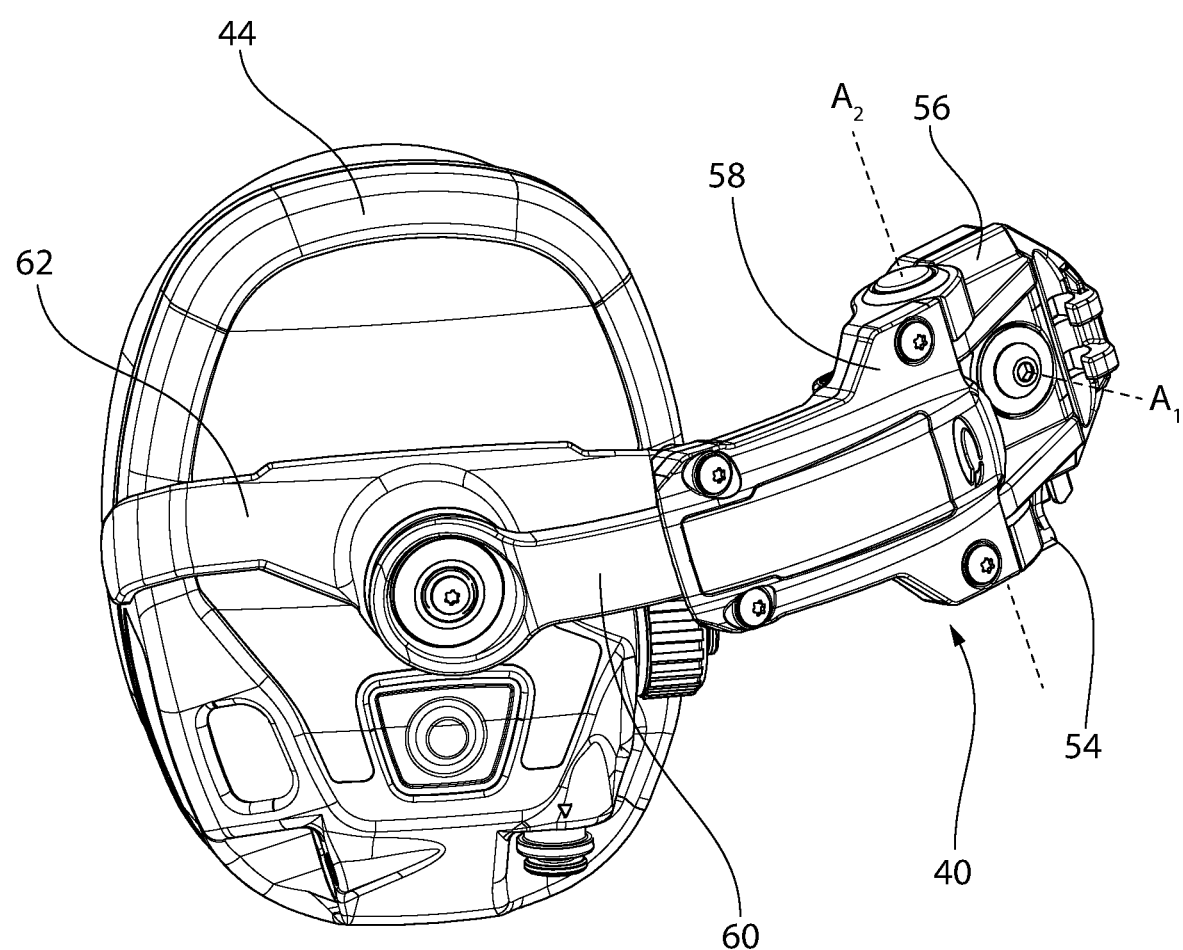
FIG. 8 is a left-side elevational view of the ear cup and accessory coupling system of FIG. 3.
Figure 9:
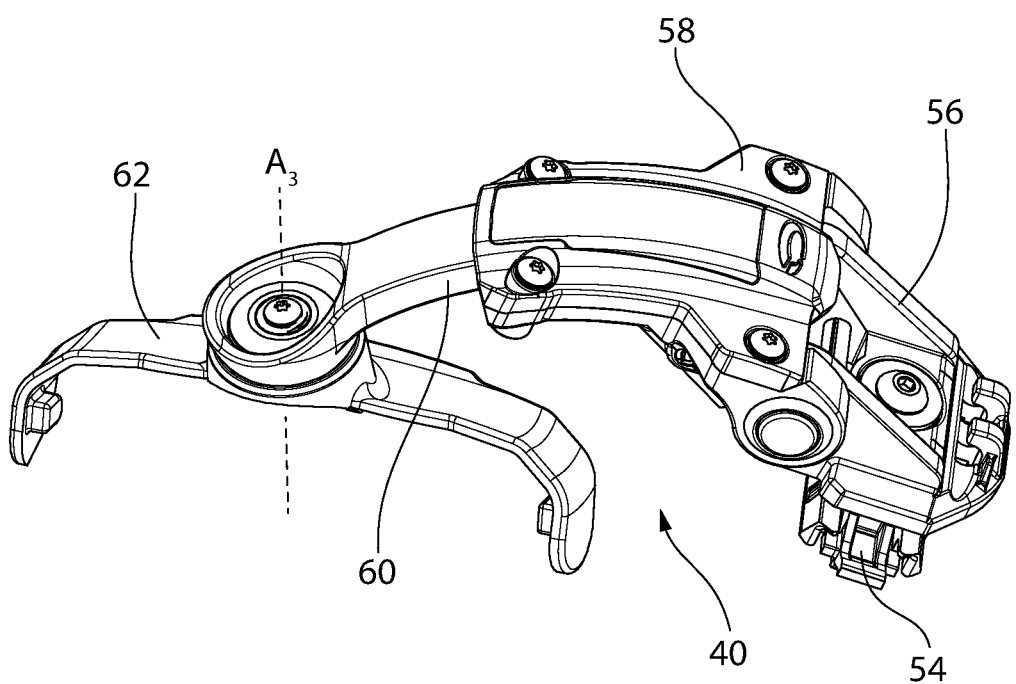
FIG. 9 is a left-side, bottom perspective view of the accessory coupling system of FIG. 3.
Figure 10:
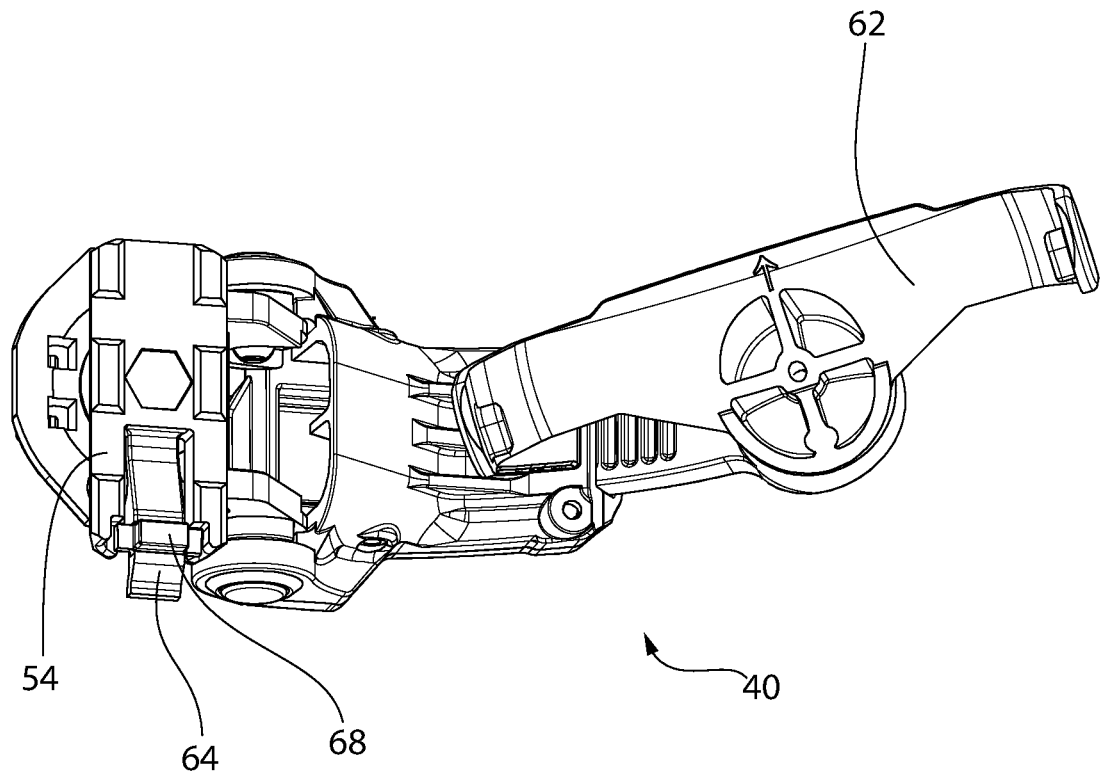
FIG. 10 is a right-side elevational view of the accessory coupling system of FIG. 3.

Referring to FIGS. 8-10, the accessory coupling system 40 may include a base 56, an intermediate member 58, an attachment arm 60, and a harness 62. The base 56 may be configured to be detachably coupled to the rail 48. The base 56 may include a connector 54 or rail mount shoe which may be configured to couple the accessory coupling system 40 to the rail 48. In one embodiment, the connector 54 is configured to be positioned in the channel 50 of the rail 48.

Figure 11:
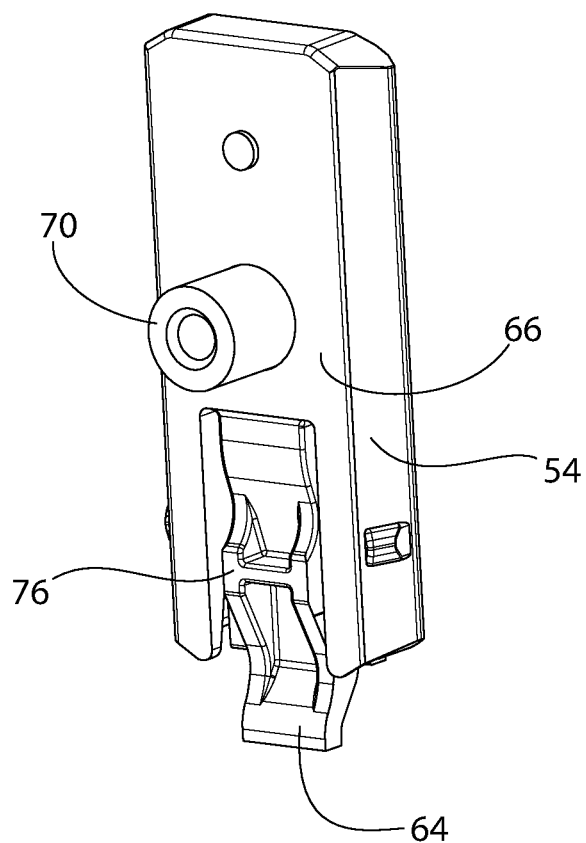
FIG. 11 is a rear, left-side perspective view of the connector of FIG. 3.
Figure 12:
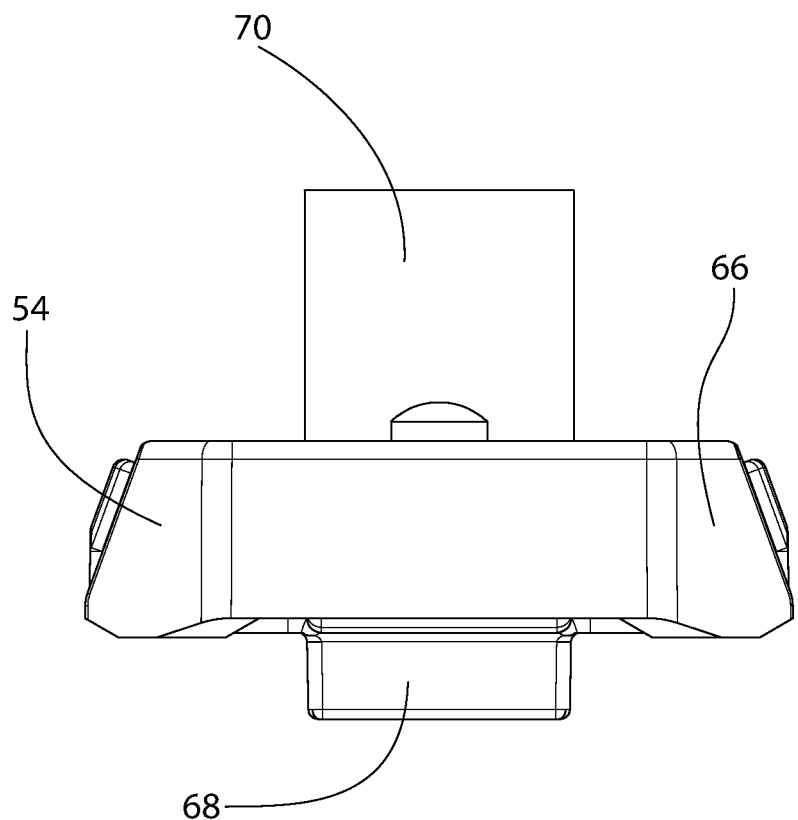
FIG. 12 is a top plan view of the connector of FIG. 3.

Referring to FIGS. 10-12, the connector 54 may have a dove tail profile shape (e.g., when viewed from the top as seen in FIG. 12). The rail 48 may have a corresponding profile shape to that of the connector 54. The channel 50 of the rail 48 may have sidewalls that are configured (e.g., angled relative to a base of the rail 48) to receive a dove tail shaped connector 54. The connector 54 may include a latch 64. The orientation of the connector 54 relative to the rail 48 may be reversible. In some embodiments, the connector 54 may be positioned in the channel 50 with the latch 64 selectively facing up or down (e.g., toward the top of the helmet or toward the bottom of the helmet). The latch 64 may be moveable relative to a body 66 of the connector 54 (FIG. 11). The latch 64 may be manually engageable by a user's thumb to move the latch 64 relative to the body 66. The back side of the latch 64 may include a protrusion 68 configured to be positioned in a selected one of the recess 52 in the channel 50 of the rail 48. The latch 64 may be biased such that a force must be applied to remove the protrusion 68 from the recess 52. The connector 54 may be moveable along the length of the channel 50 such that a user may select the position of the connector 54 relative to the rail 48 as desired or disengage the connector 54 from the rail 48. In some embodiments, a user may engage the latch 64 and move the connector 54 relative to the rail 48 with one hand while the user is wearing the helmet 46. The latch 64 may fix the position of the connector 54 relative to the rail 48. The connector 54 may move relative to the rail 48 while coupled to the rail 48 by disengaging the latch 64 from the recess 52.

Figure 13:
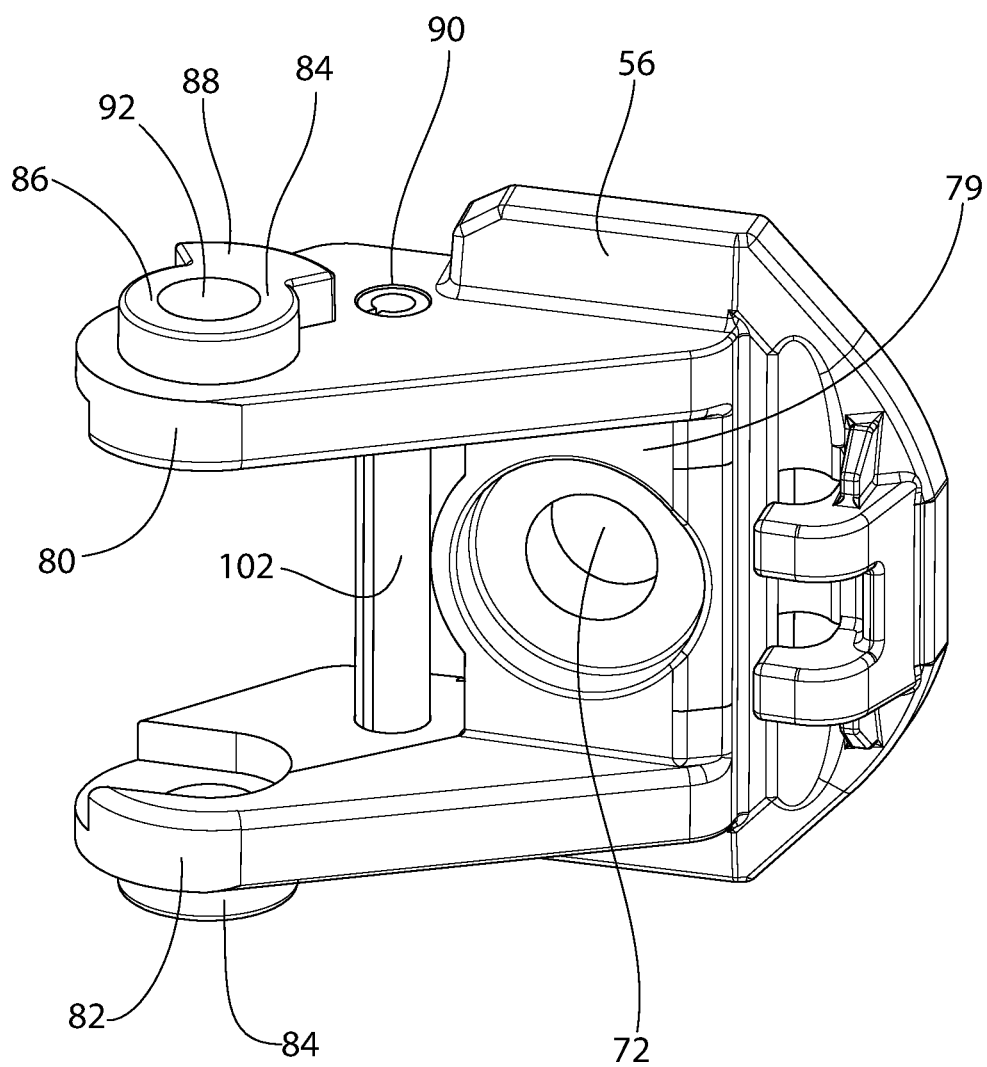
FIG. 13 is a left-side elevational view of the base of FIG. 3.
Figure 23:
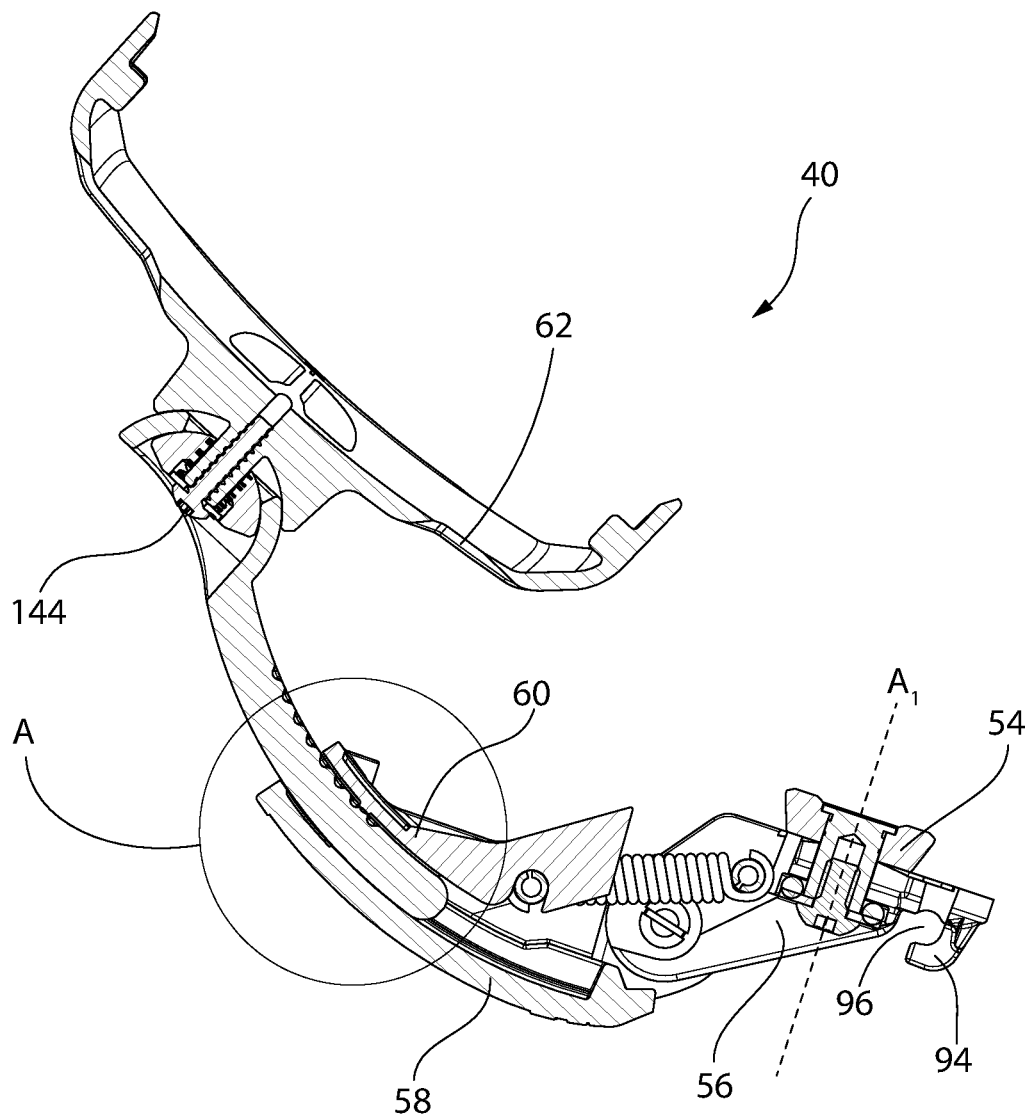
FIG. 23 is a top sectional view of the accessory coupling system of FIG. 3.
Figure 24:
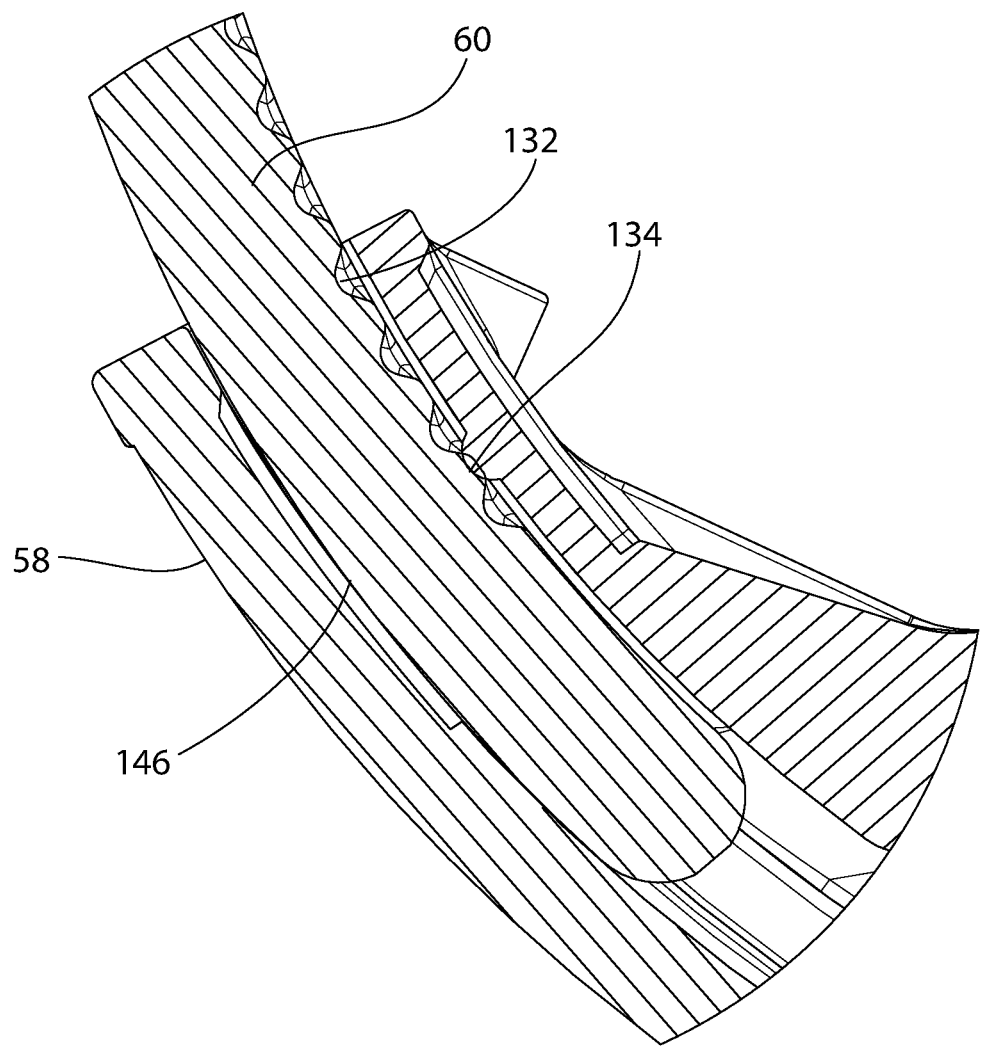
FIG. 24 is a close-up view of section A of FIG. 23.

Referring to FIGS. 8 and 10-13, in some embodiments, the base 56 and the connector 54 are a unitary construct. In other embodiments, the connector 54 and base 56 are separate elements fixed to each other. In still other embodiments, the connector 54 and base 56 are coupled to each other such that the base 56 can move (e.g., rotate) relative to the connector 54. The connector 54 may include a protrusion 70 (FIG. 11) configured to be positioned within an aperture 72 in the base 56 (FIG. 13). The base 56 may be rotatable about axis $A_1$ relative to the connector 54 about axis $A_1$ (FIGS. 8 and 23). The protrusion 70 may be coaxial with axis $A_1$. The base 56 may be rotatable relative to the connector 54 while the connector is rotatably fixed in the channel 50 of the rail 48 such that the base 56 is rotatable relative to the rail 48.

Figure 15:
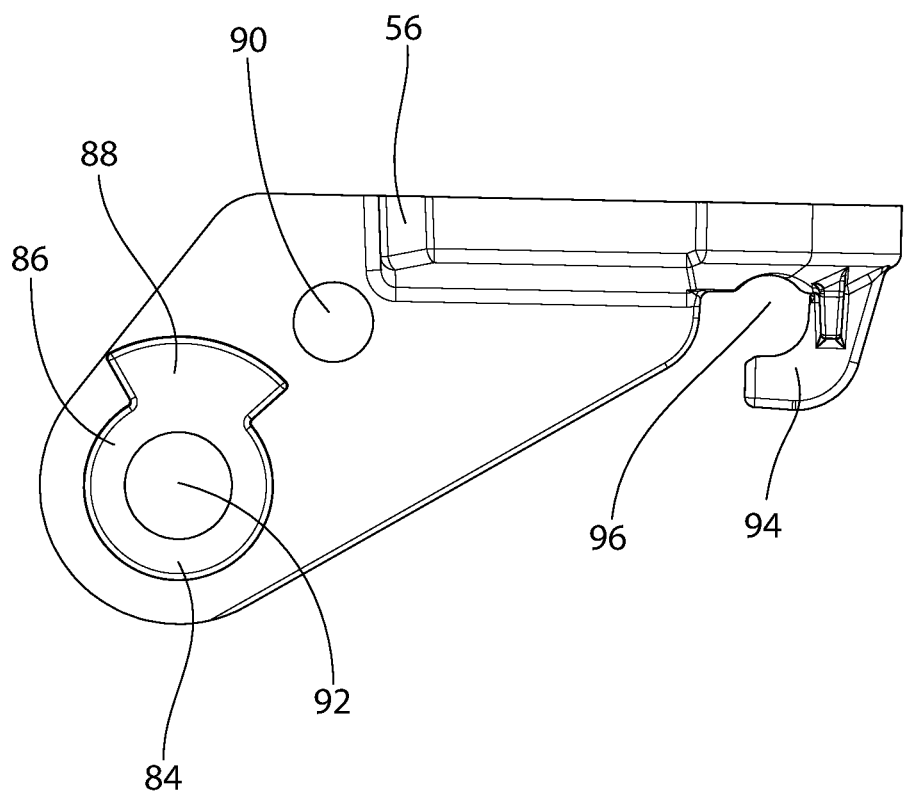
FIG. 15 is a top plan view of the base of FIG. 3.
Figure 18:
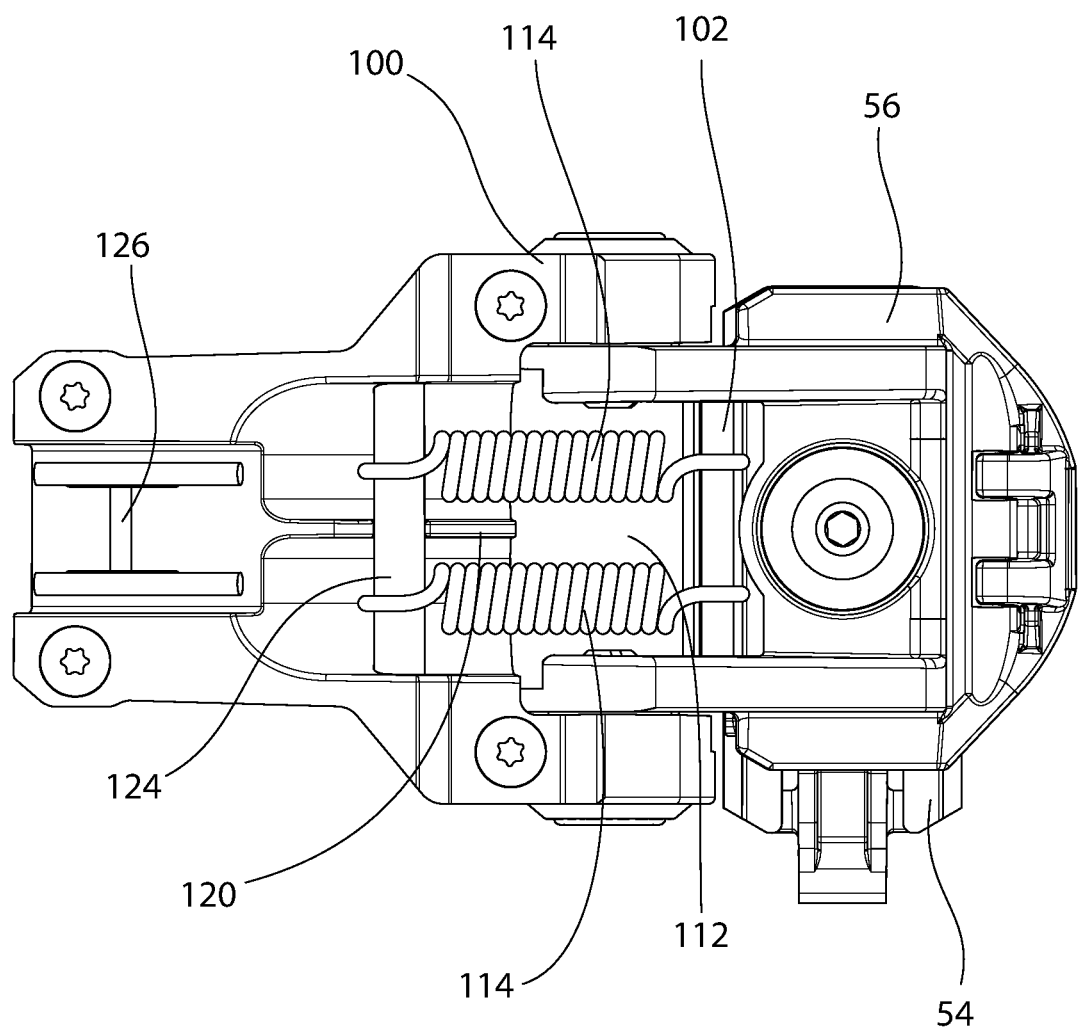
FIG. 18 is a right-side elevational view of the intermediate member of FIG. 3 with the first piece removed.
Figure 32:
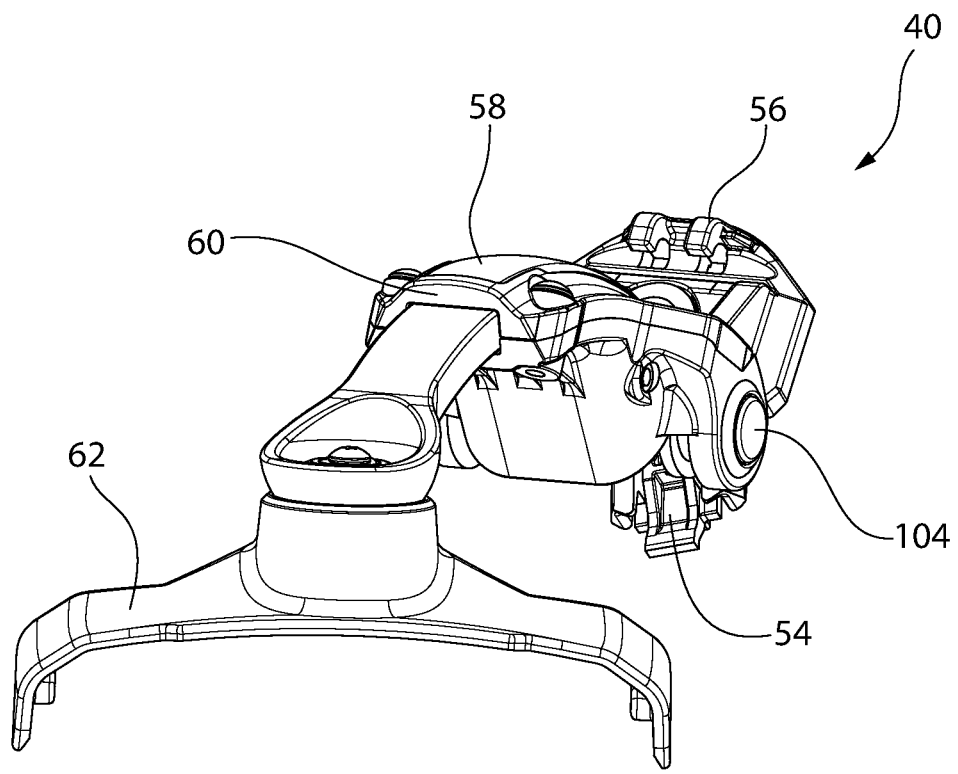
FIG. 32 is a left-side elevational view of the accessory coupling system of FIG. 3 in a detaching configuration.

Referring to FIGS. 15 and 18, a rear side of the base 56 may limit movement of the latch 64 relative to the body 66 of the connector 54. In some embodiments, the latch 64 is prevented from moving relative to the body 66 when the base 56 overlaps the latch 64. The base 56 may be rotatable relative to the connector 54 between a use position (FIG. 27), an intermediate position (FIG. 28), and a stowed position (FIG. 29). The rear surface of the base 56 may be shaped and dimensioned such that the base 56 overlaps the latch 64 when the accessory coupling system 40 is in the use position. The latch 64 may be moveable relative to the body 66 when the base 56 is rotated to a disengagement position where the base 56 does not overlap the latch 64 (FIG. 32). In some embodiments, there is a range of rotation of about 30° to about 50° in which the base 56 does not overlap the latch 64 such that the latch 64 can be disengaged from the rail 48.

Figure 14:
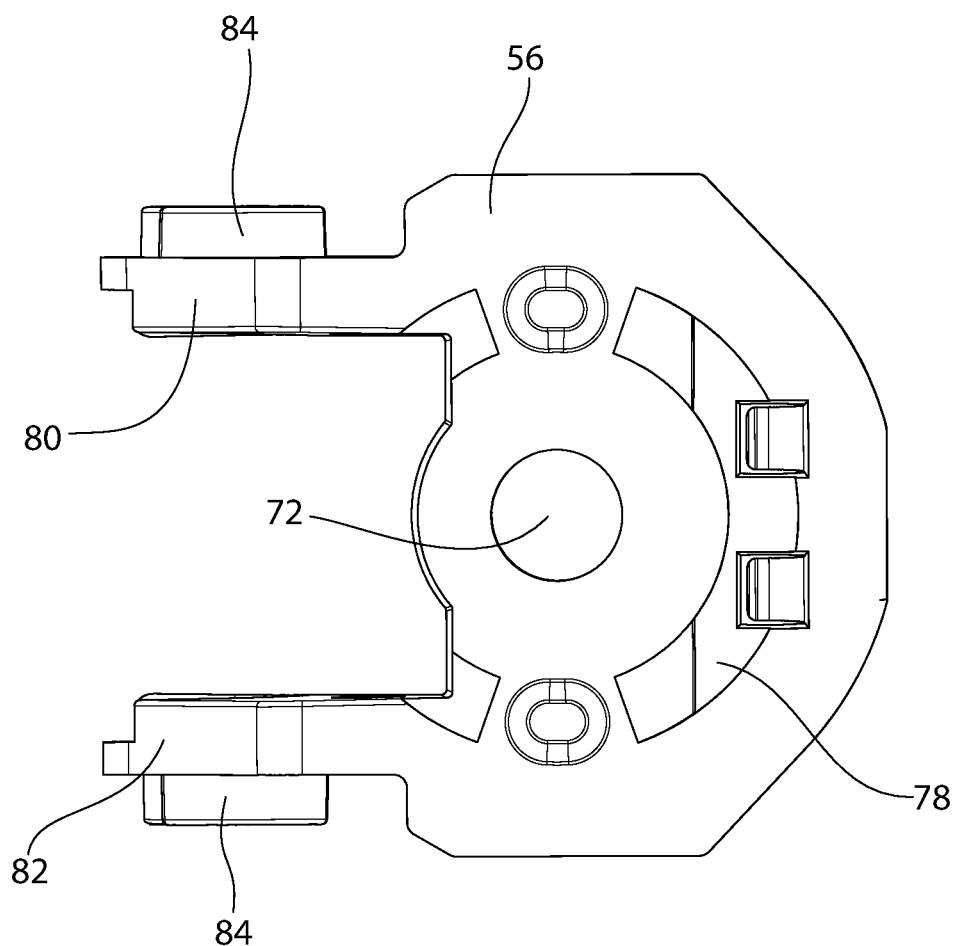
FIG. 14 is a right-side elevational view of the base of FIG. 3.

Referring to FIGS. 13-15, the base 56 may include a rear wall 79 with a top flange 80 and a bottom flange 82 extending from the rear wall 79. One or both of the top flange 80 and bottom flange 82 may be coupled to the intermediate member 58. Each of the top flange 80 and the bottom flange 82 may include a boss 84. The boss 84 may be defined by a sidewall with a first portion 86 having a first radius and a second portion 88 having a second radius. The length of the first radius may be less than the length of the second radius. The sweep angle of the arc defining the first portion 86 may be about 280°. The sweep angle of the arc defining the second portion 88 may be about 80°. In other embodiments, the sweep angle of the arc defining the first portion may be about 60°-300°. A sweep angle of the first portion 86 may be larger than the sweep angle of the second portion 88. The first portion 86 and second portion 88 may limit the relative rotation between the intermediate member 58 and the base 56, as explained below.

Still referring to FIGS. 13-15, the boss 84 may include an opening 92 to receive a connector (e.g., a threaded connector, expandable anchor, or rivet) to couple the intermediate member 58 to the base 56. The base 56 may include a recess or hole 90 (FIG. 15) to receive a post 102. In some embodiments, the post 102 and base 56 are a unitary construct. In other embodiments, the post 102 is a separate element from the base 56. The post 102 may be manufactured from a first material and the base 56 may be manufactured from a second material that is different from the first material. The first material may be selected to withstand the forces from a biasing element 114 (FIG. 18) on the post 102. The biasing element 114 may maintain the position of the intermediate member 58 relative to the base 56, as explained in greater detail below. The base 56 may include a hook 94 (FIGS. 15 and 23) which defines a receiving area 96 for a wire (e.g., wire 214 of FIG. 1) coupled to the ear cup 44.

Figure 16:
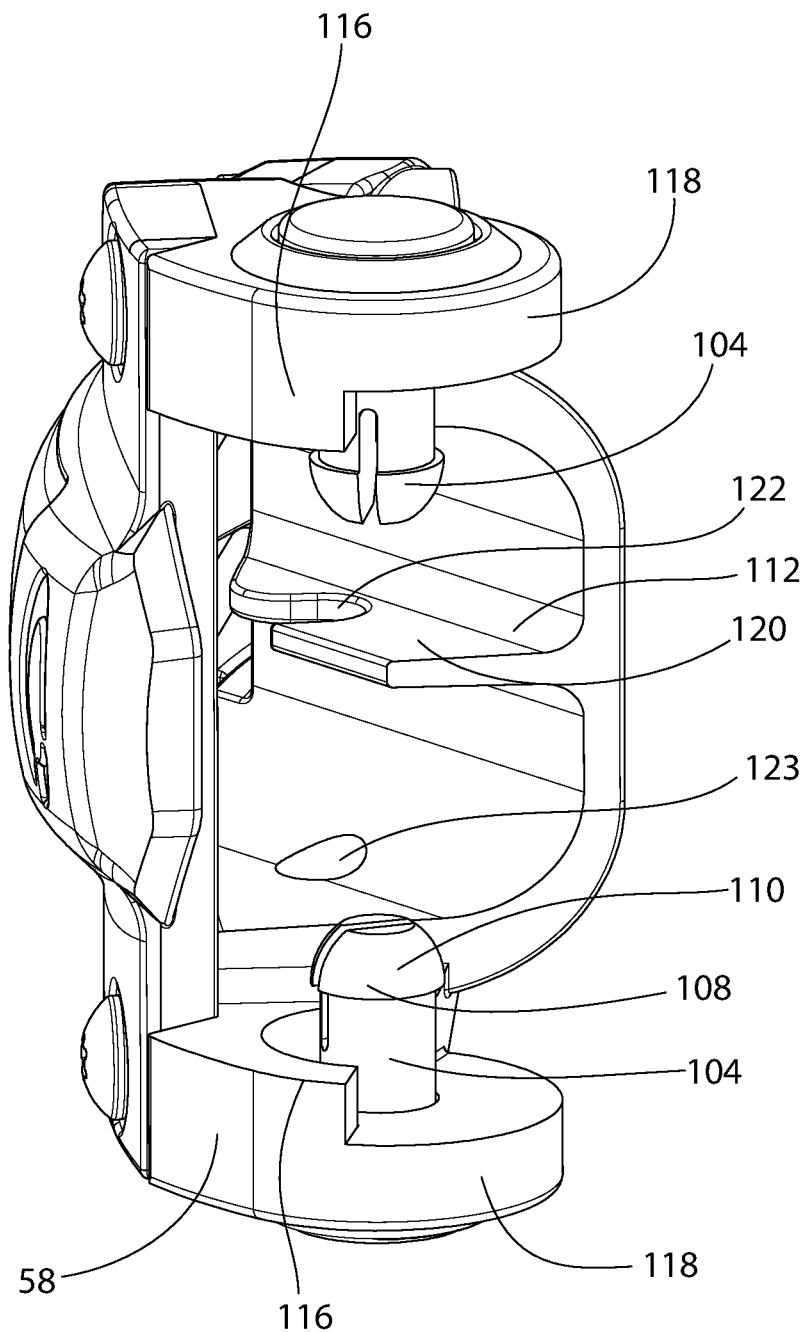
FIG. 16 is a rear elevational view of the intermediate member of FIG. 3.
Figure 17:
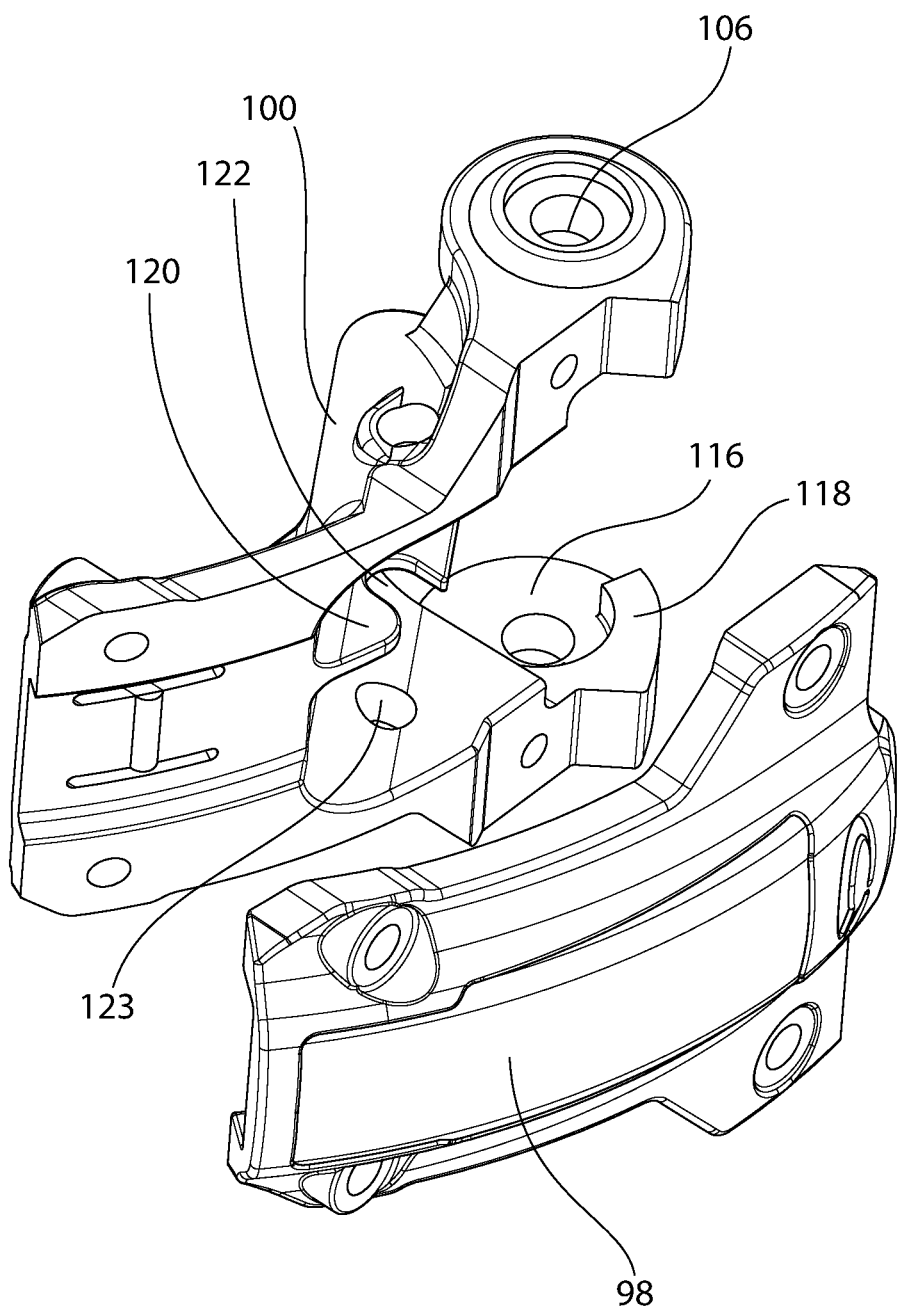
FIG. 17 is an exploded view of the intermediate member of FIG. 3.

The intermediate member 58 may be movably (e.g., rotatably) coupled to the base 56. Referring to FIGS. 16-18, the intermediate member 58 may include one or more anchors 104 configured to be rotatably received in the opening 92 of one or both of the top flange 80 and bottom flange 82 such that the intermediate member 58 can rotate about the anchor 104 relative to the base 56. The intermediate member 58 may rotate about axis $A_2$ (FIG. 8) relative to the base 56. In one embodiment, the intermediate member 58 includes a tab 118 and the anchor 104 extends from the tab 118. In other embodiments, the intermediate member 58 includes openings 106 (FIG. 17) to receive the anchor 104.

Referring to FIGS. 16-17, the anchor 104 may be a split pin such that the anchor 104 can flex to reduce its diameter as the anchor 104 is moved through the opening 106. The anchor 104 may include a head 110 configured to be inserted through the opening 92 of the base 56. The anchor 104 may include a ledge 108 configured to engage the top flange 80 or bottom flange 82 to prevent decoupling between the base 56 and the intermediate member 58. The anchor 104 may be rotatable relative to one or both of the intermediate member 58 and the base 56 when the anchor 104 is within opening 92 or opening 106. The tab 118 may include a ledge 116 configured to contact the second portion 88 of the boss 84 to limit the relative rotation between the base 56 and the intermediate member 58.

Referring to FIGS. 16-18, the intermediate member 58 may include a first piece 98 and a second piece 100 detachably coupled to each other (e.g., via threaded connector, magnet, snap fit, hook and loop fastener). The first piece 98 and second piece 100 may define a first channel 112 (FIG. 16) to receive biasing element 114 (FIG. 18) such that the biasing element 114 is housed within the intermediate member 58. FIG. 18 shows the base 56 coupled to the intermediate member 58 with the first piece removed for ease of discussion. A divider 120 may extend into the channel 112 from one of the first piece 98 and the second piece 100. The divider 120 may make the intermediate member 58 more rigid than an intermediate member that does not include a divider. In one embodiment, the divider 120 may be positioned equidistant between an upper boundary and lower boundary of the first channel 112. In other embodiments, the divider 120 may be positioned closer to the upper or lower boundary of the first channel 112. The first channel 112 may receive, for example, two biasing elements 114 of equal size. The first channel 112 may receive a selected number of biasing elements 114 that may be of the same or different size or spring force constant. The divider 120 may extend from the second piece 100 to the first piece 98 such that the first channel 112 is divided into two or more first channels.

Still referring to FIGS. 16-18, the intermediate member 58 may include an opening 123 to receive a post 124. The divider 120 may include an opening or trough 122 to receive the post 124. The biasing element 114 may be coupled to post 102 and post 124 (FIG. 18) to maintain a position of the intermediate member 58 relative to the base 56. In some embodiments, biasing element 114 is a spring. The spring rate of the biasing element 114 may be about 50 lb/in, about 75 lb/in, about 100 lb/in, about 125 lb/in, about 150 1b/in, or about 175 lb/in. The biasing element 114 may have a length of about 0.5 inches, about 0.75 inches, about 1 inch, about 1.25 inches, or about 1.5 inches when the biasing element is not subject to any compressive or tensile forces. The maximum length of the biasing element 114 may be about 0.5 inches, about 0.75 inches, about 1 inch, about 1.25 inches, about 1.5 inches, about 1.75 inches, or about 2 inches. The outer diameter of the biasing element 114 may be about 0.15 inches, about 0.2 inches, about 0.25 inches, about 0.3 inches, about 0.35 inches, about 0.4 inches, about 0.45 inches, about 0.5 inches, or about 0.75 inches. The biasing element 114 may have a wire diameter of about 0.025 inches, about 0.05 inches, about 0.06 inches, about 0.075 inches, or about 0.1 inches. The biasing element 114 may be configured to withstand a maximum load of about 20 lbs., about 25 lbs., about 27.5 lbs., about 30 lbs., about 35 lbs., about 40 lbs., about 45 lbs., or about 50 lbs. The biasing element 114 may be subject to an initial tension of about 2.5 lbs., about 3 lbs., about 3.5 lbs., about 4 lbs., about 4.5 lbs., about 5 lbs., or more than about 5 lbs. In one embodiment, the force imparted on the user by the ear cup 44 is approximately 2.0-3.5 lbs.

Figure 19:
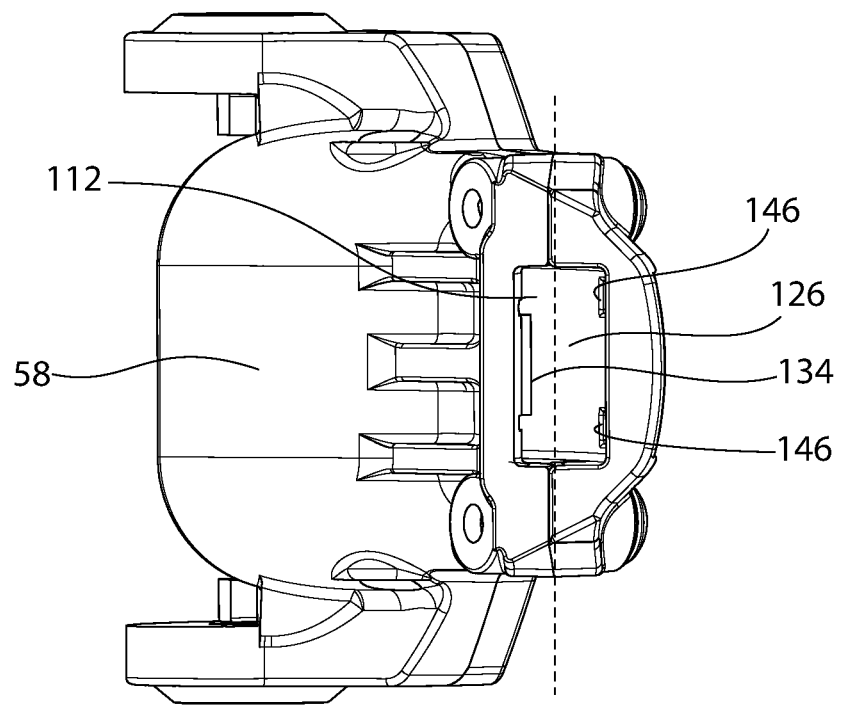
FIG. 19 is a front elevational view of the intermediate member of FIG. 3.

Referring to FIGS. 16, 18, and 19, the intermediate member 58 may include a second channel 126 (FIG. 19) configured to receive the attachment arm 60. In some embodiments, first channel 112 and second channel 126 are connected to each other such that a continuous channel extends through the intermediate member 58. The first channel 112 (FIG. 16) and second channel 126 (FIG. 19) may be separated from each other. One or both of the first channel 112 and second channel 126 may have an arcuate shape with a radius similar to that of the helmet 46 to reduce or minimize the distance that the accessory coupling system 40 extends radially away from the center of a user's head. In one embodiment, the sweep angle of the second channel 126 is about 1 radian, about 1.5 radians, about 2 radians, about 2.35 radians, about 2.5 radians, about 2.75 radians, or about 3 radians.

Figure 20:
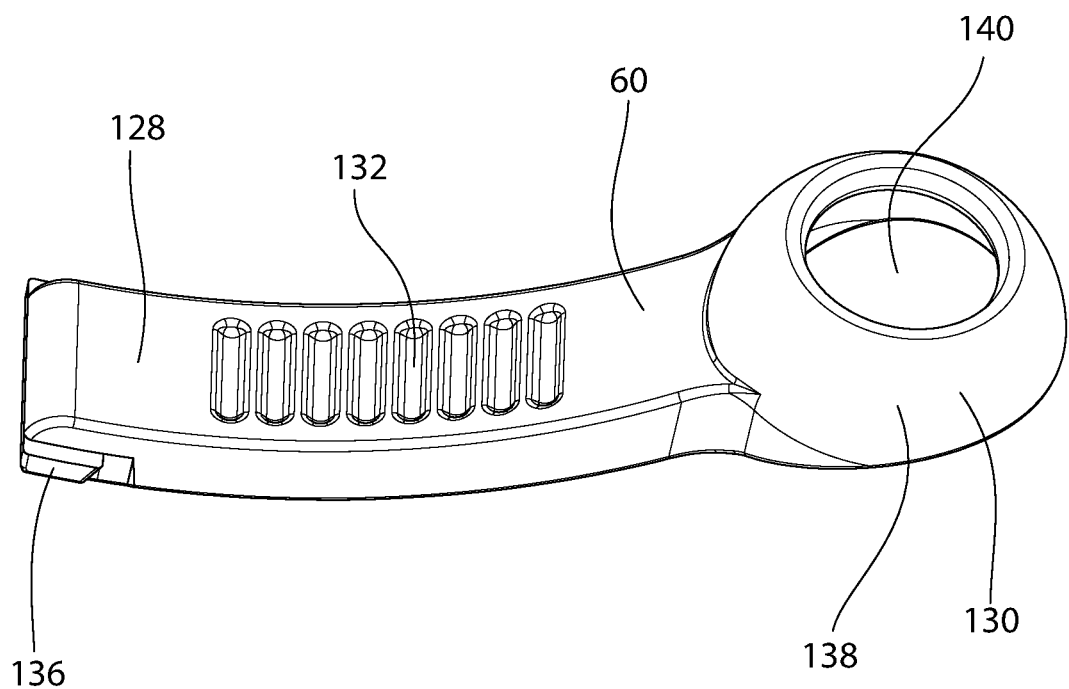
FIG. 20 is a top, right-side perspective view of the attachment arm of FIG. 3.
Figure 21:
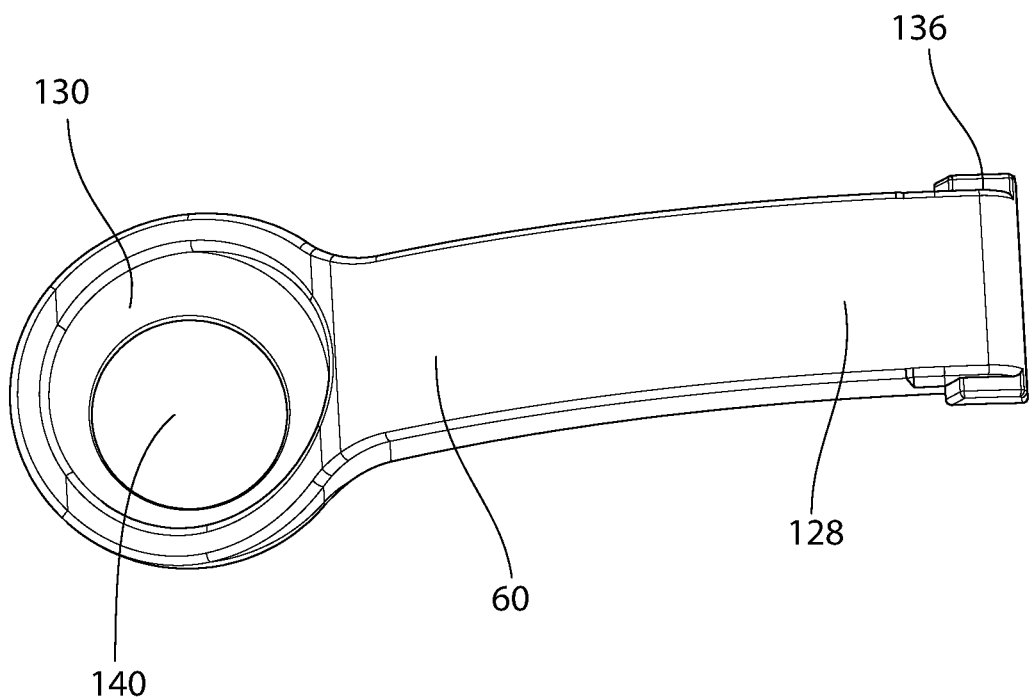
FIG. 21 is a left-side elevational view of the attachment arm of FIG. 3.
Figure 22:
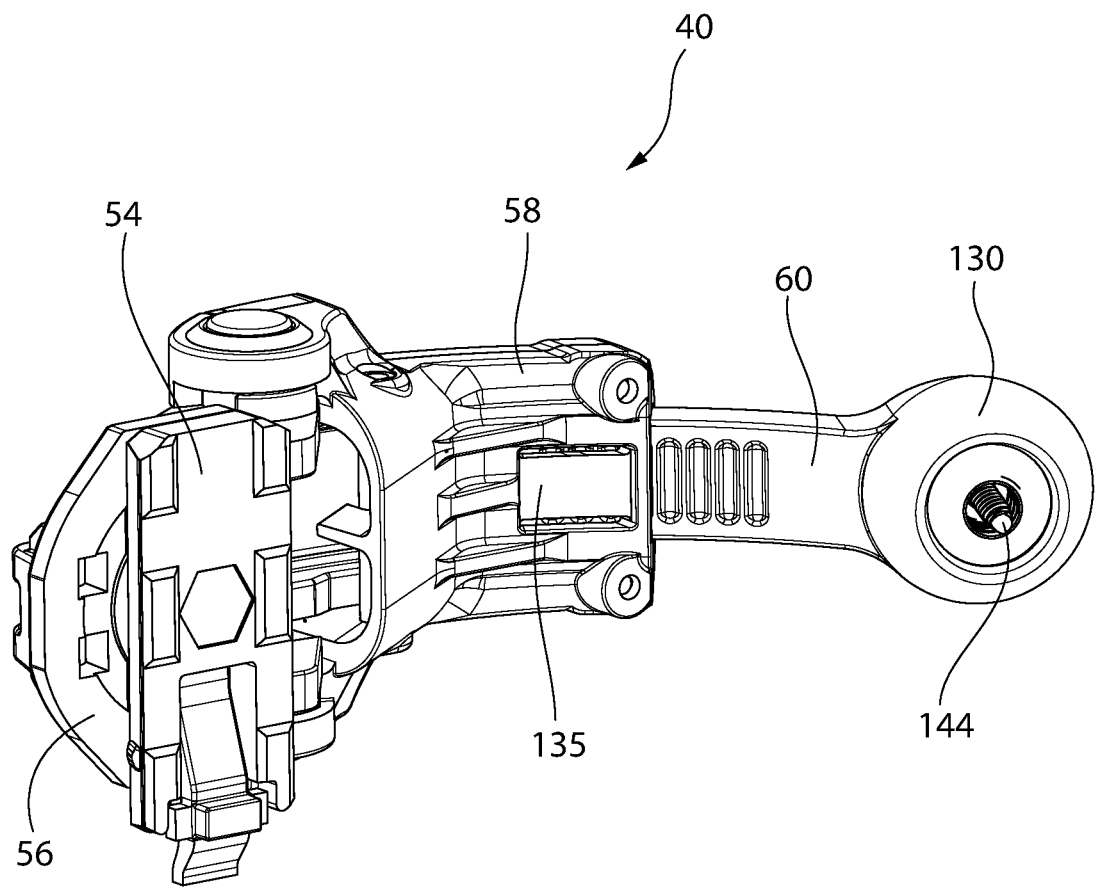
FIG. 22 is a right-side elevational view of the accessory coupling system of FIG. 3 with the harness removed.

Referring to FIGS. 20-22, the attachment arm 60 may be moveable (e.g., slideable or axially translatable) within the second channel 126 to move the ear cup 44 relative to the base 56. The attachment arm 60 may be telescopically extendable relative to the intermediate member 58. The attachment arm 60 may include a body 128 and a head 130. The body 128 may be shaped to fit within the second channel 126. The body 128 may include one or more depressions 132 configured to receive a ridge 134 on the intermediate member 58 (FIG. 19) to at least temporarily fix the position of the attachment arm 60 relative to the intermediate member 58. The ridge 134 may be formed on a beam 135 (FIG. 22) that is coupled to the intermediate member 58 (e.g., second piece 100). The beam 135 may flex relative to the intermediate member 58 as the ridge 134 exits the depressions 132 when the attachment arm 60 is moved relative to the intermediate member 58.

Still referring to FIGS. 20-22, the attachment arm 60 may be moveable to a plurality of positions relative to the intermediate member 58 corresponding to the number of depressions 132 that receive the ridge 134. The body 128 of the intermediate member 58 may include one or more protrusions 136 that extend away from the body 128 to help prevent unintentional removal of the attachment arm 60 from the second channel 126. The intermediate member 58 may include a gasket 146 (FIG. 19) or biasing element that biases the attachment arm 60 toward engagement with the intermediate member 58 such that the ridge 134 is within and engages the selected one of the depressions 132.

Still referring to FIGS. 20-22, the rear surface 138 of the head 130 may be shaped to fit within a depression 142 on the harness 62. The head 130 and the depression 142 may form a ball joint. The head 130 may nest within the depression 142. The head 130 may have a hemispherical shape. In one embodiment, the head 130 comprises a spherical segment having a sweep angle of about 0.2 radians, about 0.3 radians, about 0.3 radians, about 0.469 radians, about 0.5 radians, about 0.6 radians, about 0.7 radians, or about 0.8 radians. The rear surface of the head 130 may extend rearwardly away from a rear surface of the attachment arm 60. The head 130 may include an aperture 140 configured to receive a connector 144 (e.g., threaded connector, rivet, adhesive, or weld) to couple the harness 62 to the attachment arm 60. The front of the head 130 may be concave to receive a connector 144 to couple the attachment arm 60 to the harness 62 such that the connector 144 does not extend forward of the front surface of the head 130 to reduce any potential snag points. The rear surface 138 of the head may be convex. The harness 62 may be rotatable about axis $A_3$ (FIG. 9). In some embodiments, the harness 62 is rotatable about the connector 144 relative to the attachment arm 60. In other embodiments, the harness 62 is fixed relative to the attachment arm 60.

Figure 25:
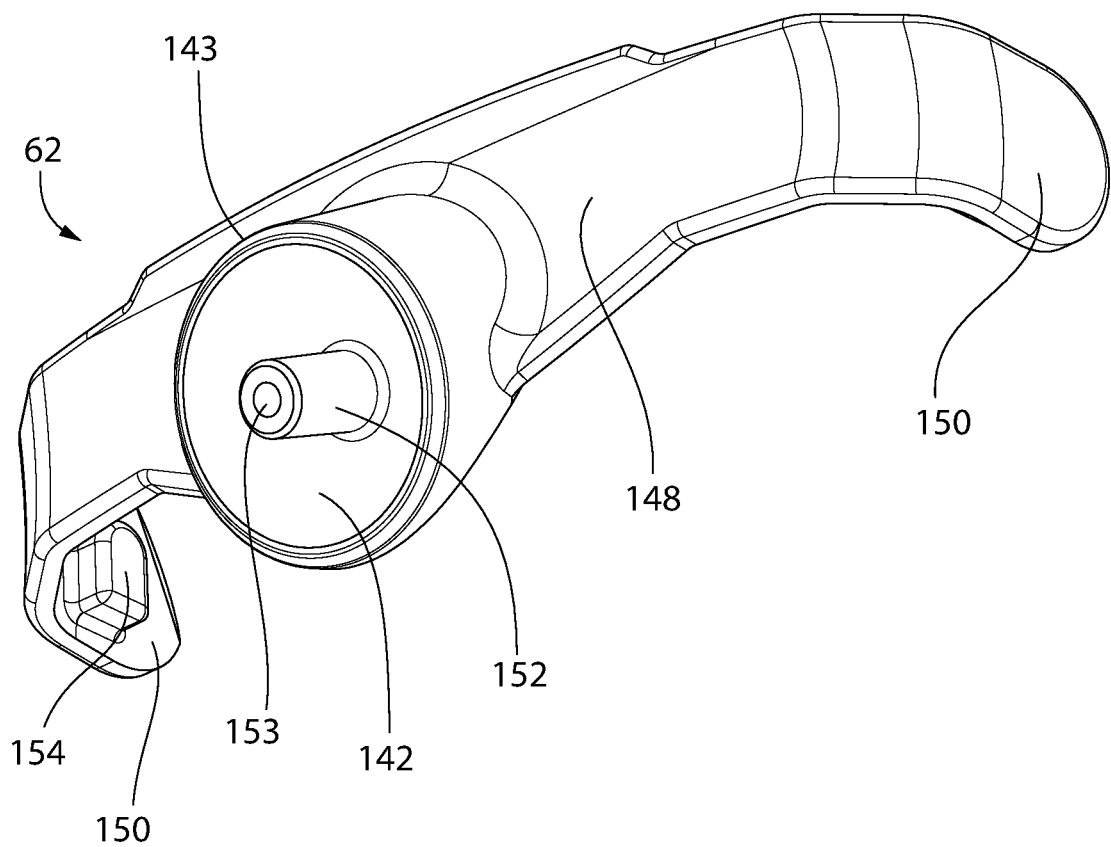
FIG. 25 is a bottom, left-side perspective view of the harness of FIG. 3.

Referring to FIGS. 1 and 25, the harness 62 may include a sleeve 152 configured to receive the connector 144. The sleeve 152 may be positioned in the depression 142 such that the harness 62 is rotatable relative to the attachment arm 60 about the sleeve 152. The depression may include a rim 143 and a front end of the sleeve 153 may extend forward further than the rim 143 of the depression. The depression 142 may be concave to receive the convex rear surface of the head 130. The harness 62 may include a body 148 and a return 150 at each end of the body 148. The length of the body 148 may be selected based on the width of the ear cup 44 that the harness 62 will be coupled to. The return 150 may wrap around a side of the ear cup 44 when the harness 62 is couple to the ear cup 44. The returns 150 may include a protuberance 154 configured to be positioned in a recess 156 on the ear cup 44. In some embodiments, the protuberance 154 has a D-shape. The body 148 may be flexible such that the protuberance 154 can be snap fit onto the ear cup 44. The harness 62 may be detachably coupled to the ear cup 44. The ear cup 44 may be detachable from the harness 62 while the harness is coupled to the accessory coupling system 40. The ear cup 44 may be detachable from the harness 62 without using any tools. The ear cup 44 may be detachable from the harness 62 with one hand. The ear cup 44 may be detachable from the harness 62 while wearing helmet 46. The harness 62 may be detachable from the ear cup 44 while any electrical connectors or wires are still connected to the ear cup 44.

Referring to FIGS. 26-29, the intermediate member 58 may be rotatable relative to the base 56 about the anchor 104 between a first position (FIG. 26), a second position (FIG. 27), and a third position (FIG. 28). The first position may approximate the position of the intermediate member 58 during use of the accessory coupling system 40 and the ear cup 44 is positioned adjacent or against a user's ear. Although only three positions are shown, the intermediate member 58 may be rotated to any selected position relative to the base 56 within the range of motion defined by the second portion 88 of the boss 84 and the ledge 116 of the tab 118.

Referring to FIGS. 26-31, the intermediate member 58 may be in the first position (FIG. 26) when the ear cup 44 is in the use position (FIG. 29). The intermediate member 58 may be in the second position (FIG. 27) when the ear cup 44 is in the intermediate position (FIG. 30). The intermediate member 58 may be in the third position (FIG. 28) when the ear cup 44 is in the storage position (FIG. 31).

Figure 26:
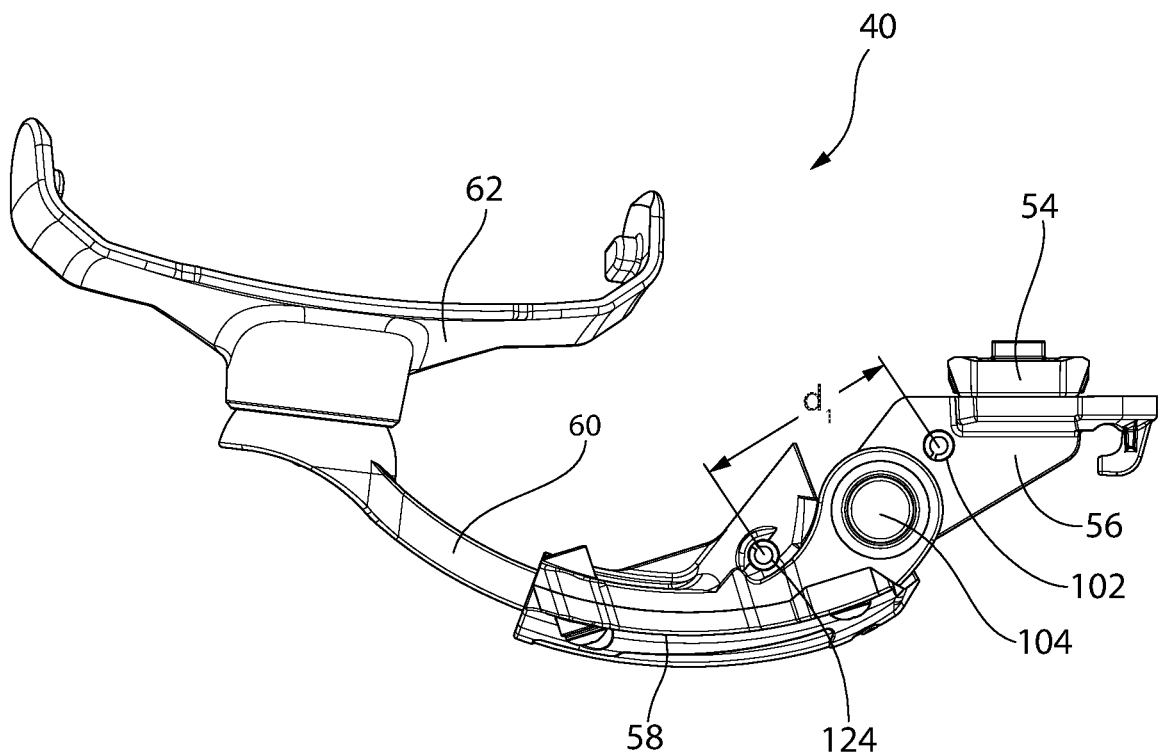
FIG. 26 is top plan view of the accessory coupling system of FIG. 3 in a first position.

Referring to FIGS. 26-28, the biasing element 114 may bias the intermediate member 58 toward the third position (FIG. 28). The force exerted by the biasing element 114 may be selected to balance the user's comfort when the intermediate member is in the first position (FIG. 26) with performance of the ear cup (e.g., blocking sound). The biasing element 114 may in a relaxed state (e.g., neither compressed nor elongated) when the intermediate member 58 is in the third position. The length of the biasing element 114 may be defined by the distance between post 102 and post 124. Post 102 and post 124 may be separated by distance $d_1$ when the intermediate member 58 is in the first position (FIG. 26). Post 102 and post 124 may be separated by distance $d_2$ when the intermediate member 58 is in the second position (FIG. 27). Post 102 and post 124 may be separated by distance $d_3$ when the intermediate member 58 is in the third position (FIG. 28). In some embodiments, distance $d_1$ is adjustable to allow a user to adjust the force exerted by the biasing element when the intermediate member 58 is in the first position. In one embodiment, the force exerted by the biasing element 114 in the third position is approximately zero. In one embodiment, the force exerted by the biasing element 114 once the intermediate member 58 is moved is approximately 2.1 lb. In one embodiment, the force exerted by the biasing element 114 in the first position is approximately 3.2 lb. In one embodiment, the force exerted by the biasing element 114 in the second position is approximately 6 lb.

Referring to FIGS. 29-32, the base 56 may be rotatable relative to the connector 54 about the protrusion 70 between a use position (FIG. 29), an intermediate position (FIG. 30), and a storage position (FIG. 31). In some embodiments, the latch 64 may be disengaged from the rail 48 when the base 56 is rotated to a certain orientation relative to the connector 54 (FIG. 32). The latch 64 may be moved to disengage from the rail with one hand to decouple the connector 54 from the rail. The latch 64 may be engaged by a user's thumb and the user's fingers of the same hand may engage the base 56 or connector 54 to move the connector 54 relative to the rail 48 to decouple the connector 54 from the rail 48. Decoupling the connector 54 from the rail 48 may decouple the accessory coupling system 40 from the helmet 46.

Referring to FIGS. 34-41, there is shown an accessory coupling system, generally designated 180. The accessory coupling system 180 may include a headband 182 and a harness 184 configured to couple ear cup 44 to a user's head. The headband 182 may be a flexible element (e.g., metal, plastic) configured to flex to generally conform to the shape of a user's head. The headband 182 may include reinforcing ridges 186 to provide additional stiffness to the headband 182. The ridges 186 may resist torsional twisting of the headband 182. In some embodiments, the headband 182 is sized and dimensioned to be worn over the top of a user's head (e.g., under a helmet or without a helmet). In one embodiment, the width of the headband 182 is approximately 1.375 inches. In one embodiment, the thickness of the headband 182 is approximately 0.35 inches to about 0.45 inches. In other embodiments, the headband 182 is sized and dimensioned to be worn behind a user's nape (e.g., as a nape band). In still other embodiments, the headband 182 is sized and configured to be worn over a helmet.

Figure 35:
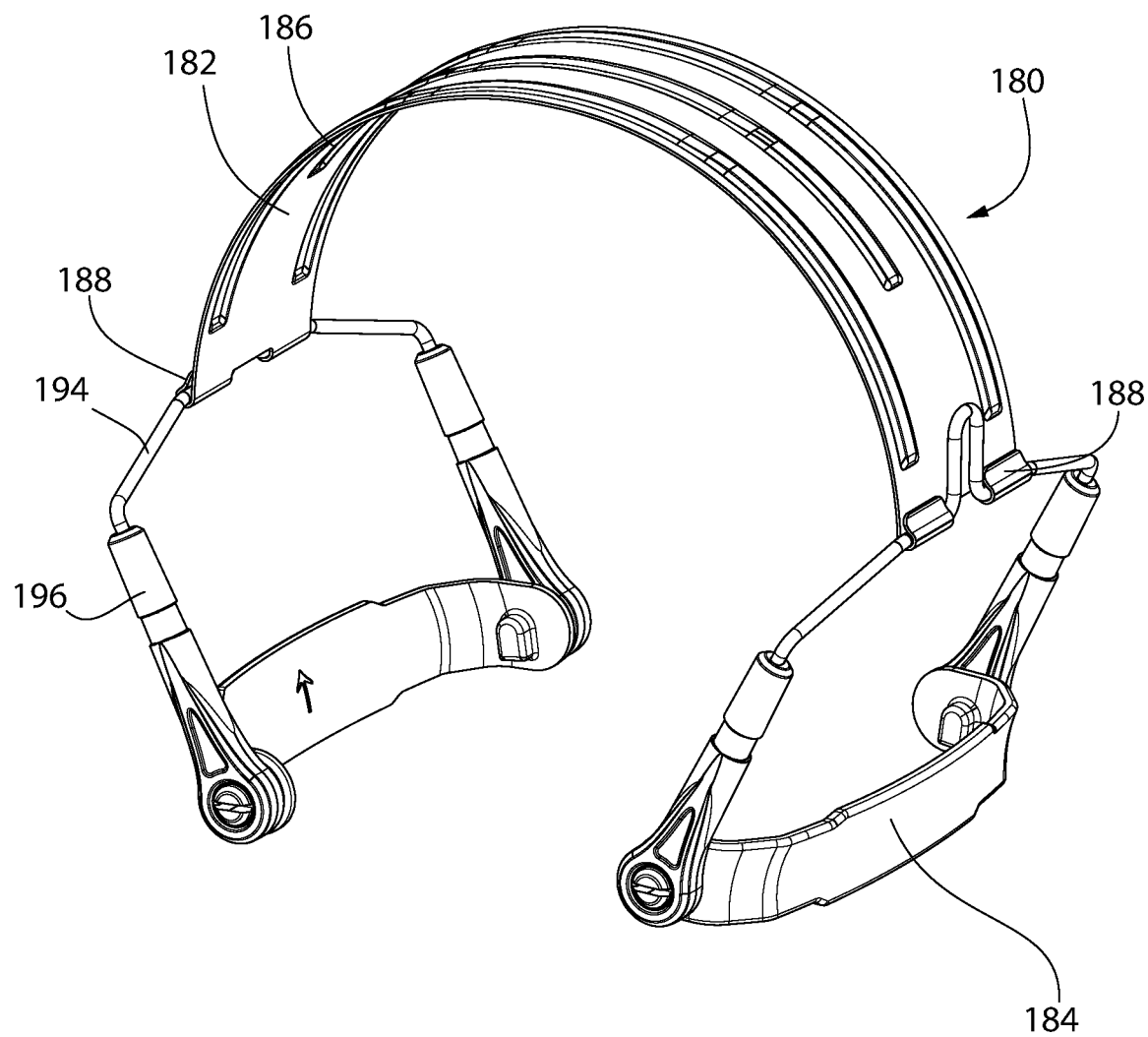
FIG. 35 is a front, left-side perspective view of the accessory coupling system of FIG. 34 with the ear cup and cover removed.
Figure 38:
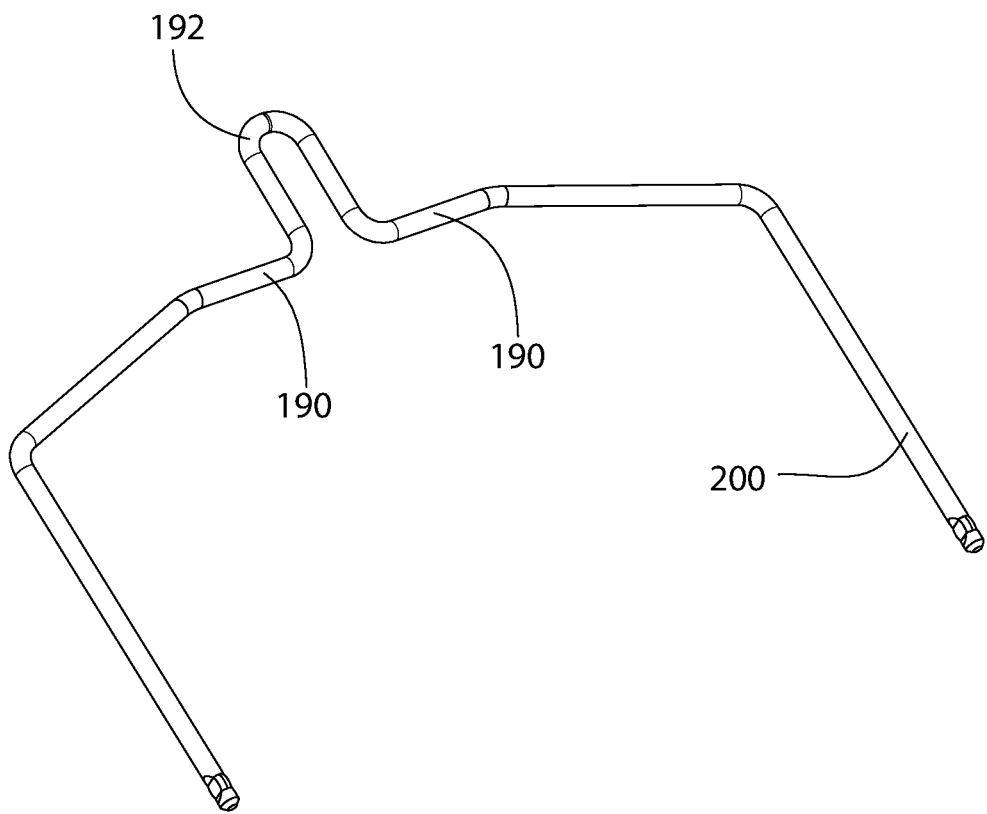
FIG. 38 is a front elevational view of the frame of FIG. 34.

Referring to FIGS. 35 and 38, accessory coupling system 180 may include a frame 194 coupled to the headband 182. The frame 194 may include an axle 190 (FIG. 38) and the headband 182 may include a bearing 188 configured to receive the axle 190. In some embodiments, the bearing 188 comprises a portion of the headband 182 folded over to form a closed loop or open-ended loop. The frame 194 may be rotationally fixed to the headband 182 (e.g., via adhesive or weld) when the axle 190 is in the bearing 188. The bearing 188 may receive the axle 190 such that the frame 194 can rotate relative to the headband 182. A limiter 192 may be positioned in a notch of the bearing 188. The limiter 192 may limit the range of relative rotation between the frame 194 and the headband 182.

Figure 37:
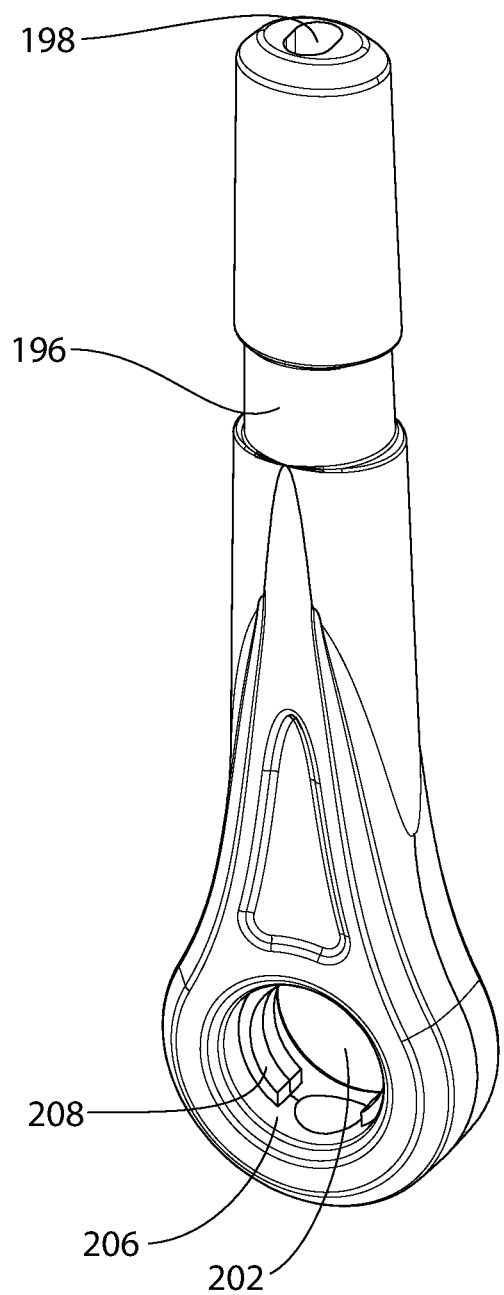
FIG. 37 is a left-side elevational view of the sleeve of FIG. 34.

Referring to FIGS. 37 and 38, a sleeve 196 may be coupled to the frame 194 and the harness 184. The sleeve 196 may include a pocket 198 (FIG. 37) configured to receive a pin 200 (FIG. 38) on the frame 194. The sleeve 196 may be translatable along the pin 200 to adjust the position of the ear cup 44 relative to the headband 182. The pin 200 may have a cross sectional shape other than circular to resist twisting when the pin 200 is within the pocket 198.

Figure 36:
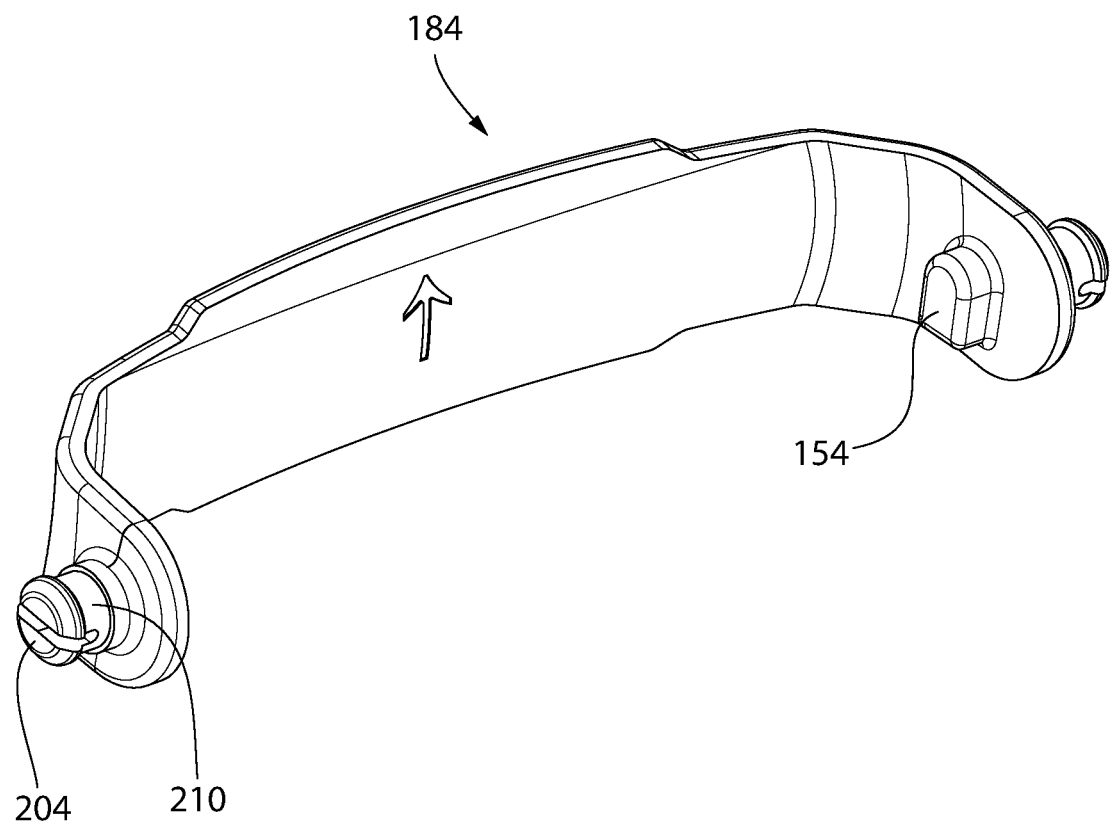
FIG. 36 is a rear elevational view of the harness of FIG. 34.

Referring to FIGS. 36-37, the sleeve 196 may include an aperture 202 (FIG. 37) to receive a post 204 (FIG. 36) on the harness 184. The post 204 may be rotationally positioned within the aperture 202 such that the ear cup 44 can rotate relative to the headband 182. The aperture 202 may be defined by a sidewall 206. An extrusion 208 may extend away from the sidewall 206 and into the aperture 202. The post 204 may include a groove 210 and the extrusion 208 may be positioned within the groove 210 when the post 204 is within the aperture 202.

Figure 39:
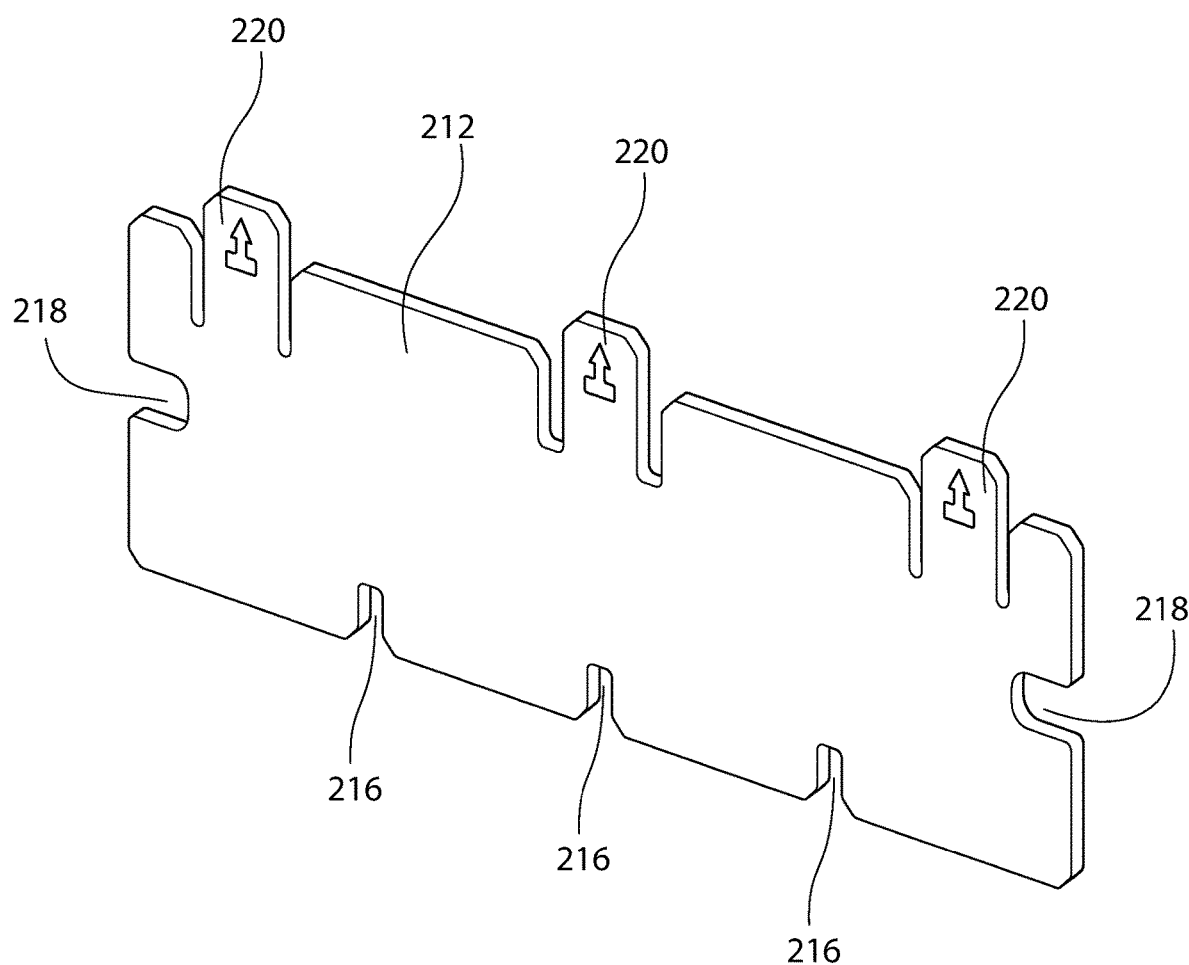
FIG. 39 is a front, top perspective view of the cover of FIG. 34.
Figure 40:
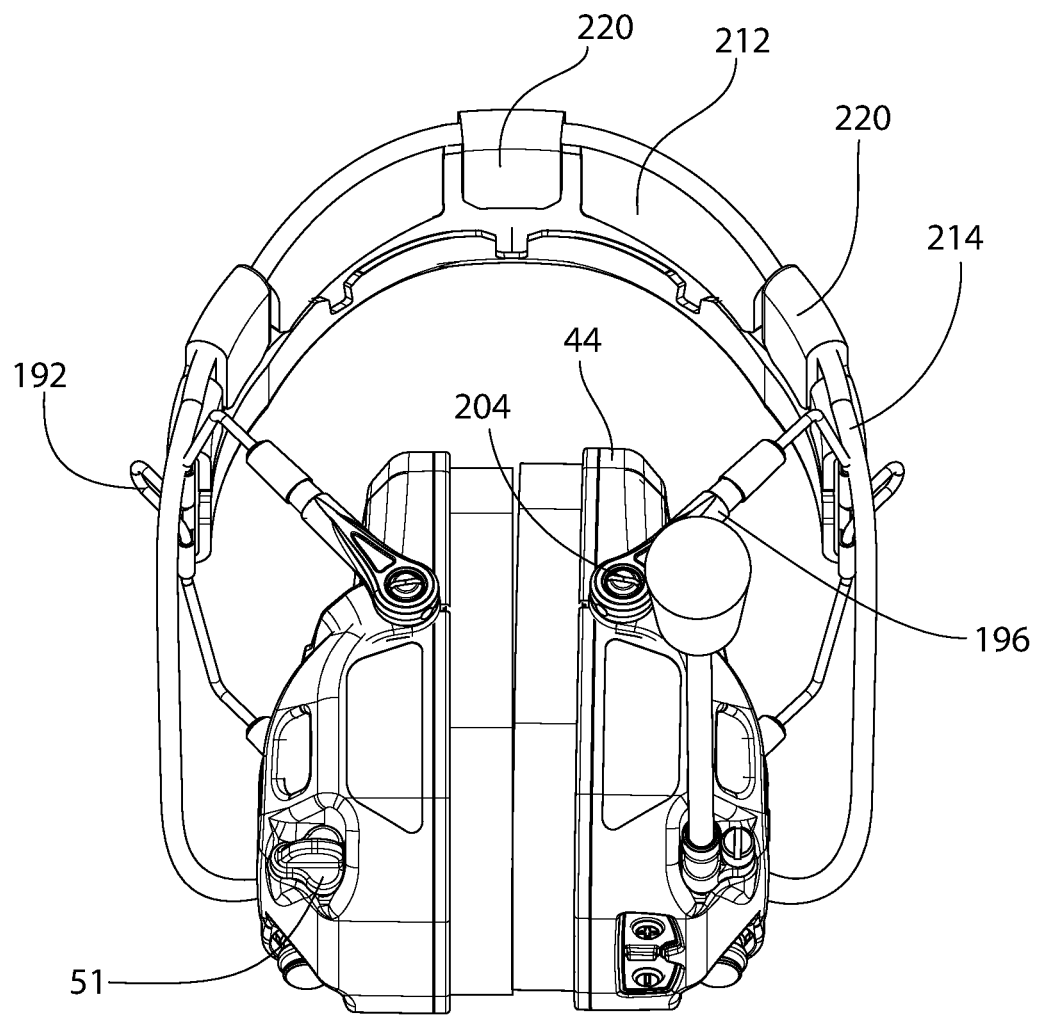
FIG. 40 is a front, bottom perspective view of the accessory coupling system of FIG. 34.

Referring to FIGS. 39-40, the accessory coupling system 180 may include a cover 212 adapted to be coupled to the headband 182. The cover 212 may increase user comfort when wearing the headband 182 by providing a compliant material in between the generally rigid headband 182 and the user's head. The cover 212 may couple a wire 214 connected to the ear cup 44 to the headband 182. The cover 212 may comprise a flexible material (e.g., fabric, laminated fabric). The cover 212 may be washable (e.g., in a washer). The cover 212 may include a fastener (e.g., hook and loop fastener, magnet, adhesive) and the headband 182 may include a corresponding fastener configured to couple to the fastener on the cover 212 to couple the cover 212 to the headband 182. The cover 212 may wrap around a portion or all of the headband 182. The cover 212 may include a fastener such that the cover 212 can be wrapped around the headband 182 and coupled to itself to couple the cover 212 to the headband 182.

Still referring to FIGS. 39-40, the cover 212 may include one or more relief cutouts 216. Cutout 216 may help avoid bunching of the cover 212 as the cover 212 follows the arcuate shape of the headband 182 (FIG. 40). The cover 212 may include a recess 218 to allow movement of the limiter 192 without contacting the cover 212. The cover 212 may include one or more tabs 220 configured to couple the wire 214 adjacent the headband 182 or cover 212. Positioning the wire 214 adjacent to the headband 182 may be more comfortable for a user than positioning the wire 214 under the headband 182. Positioning the wire 214 adjacent the headband 182 may reduce the profile of the accessory coupling system 180 compared to positioning the wire 214 on top of the headband 182. The tabs 220 may include a releasable fastener (e.g., magnet, hook and loop fastener, button, or snap) such that the wire 214 and ear cup 44 may be detached from the accessory coupling system 180 and coupled to accessory coupling system 40. The cover 212 may be coupled to a nape pad (not shown) connected to a helmet such that the tabs 220 hold the wire 214 adjacent the nape pad.

In some embodiments, the ear cup 44 is configured to provide at least one-way audio communication between a user and an external device. The ear cup 44 may include internal components including a speaker that provide audio signals to the user. Referring to FIGS. 1-3, and 6, the ear cup 44 may include microphone 42. The microphone 42 may allow a user to communicate with other users that are electrically connected to ear cup 44. The microphone 42 may be detachably coupled to the ear cup 44. The ear cup 44 may include a microphone port 41 (FIG. 6). The microphone port 41 may provide at least one of a physical connection and an electrical connection to the ear cup 44. The microphone 42 may be electrically connected to the ear cup 44 when the microphone 42 is plugged into the microphone port 41. The microphone 42 may include a fastener 43. The fastener 43 may at least temporarily fix the microphone 42 to the ear cup 44. In some embodiments, the fastener 43 is a threaded connector configured to engage a correspondingly threaded opening in the ear cup 44. The microphone port 41 may include a first opening 45 configured to receive the fastener 43. In some embodiments, the microphone 42 may be coupled to the ear cup 44 without tools (e.g., via snap fit and/or thumb screw). In other embodiments, the fastener 43 is configured to be engaged by a tool (e.g., a screwdriver). The ear cup 44 may include a plug 51 (FIG. 40). The plug 51 may be positioned in the microphone port 41 when the microphone 42 is not plugged into the microphone port 41. The plug 51 may be removably coupled to the microphone port 41.

Still referring to FIGS. 1-3 and 6, the microphone port 41 may include one or more second openings 47. The second opening 47 may provide an electrical connection between the microphone 42 and the ear cup 44 when an electrical connector 49 on the microphone is received in the second opening 47. In some embodiments, the electrical connector 49 is a two-pin arrangement compatible with a U-172 connector. In other embodiments, the electrical connector 49 is a 3.5 mm jack. In some embodiments, the microphone 42 can be detached from one of the ear cups 44 and coupled to the other of the ear cups 44, as desired. The ear cup 44 may be coupled to a wire 214 (FIG. 2). The wire 214 may provide an electrical connection between two ear cups 44. The ear cups 44 may be hardwired to each other, the wire 214 may couple to the ear cup 44 via wire port 217 (FIG. 1).

Figure 41:
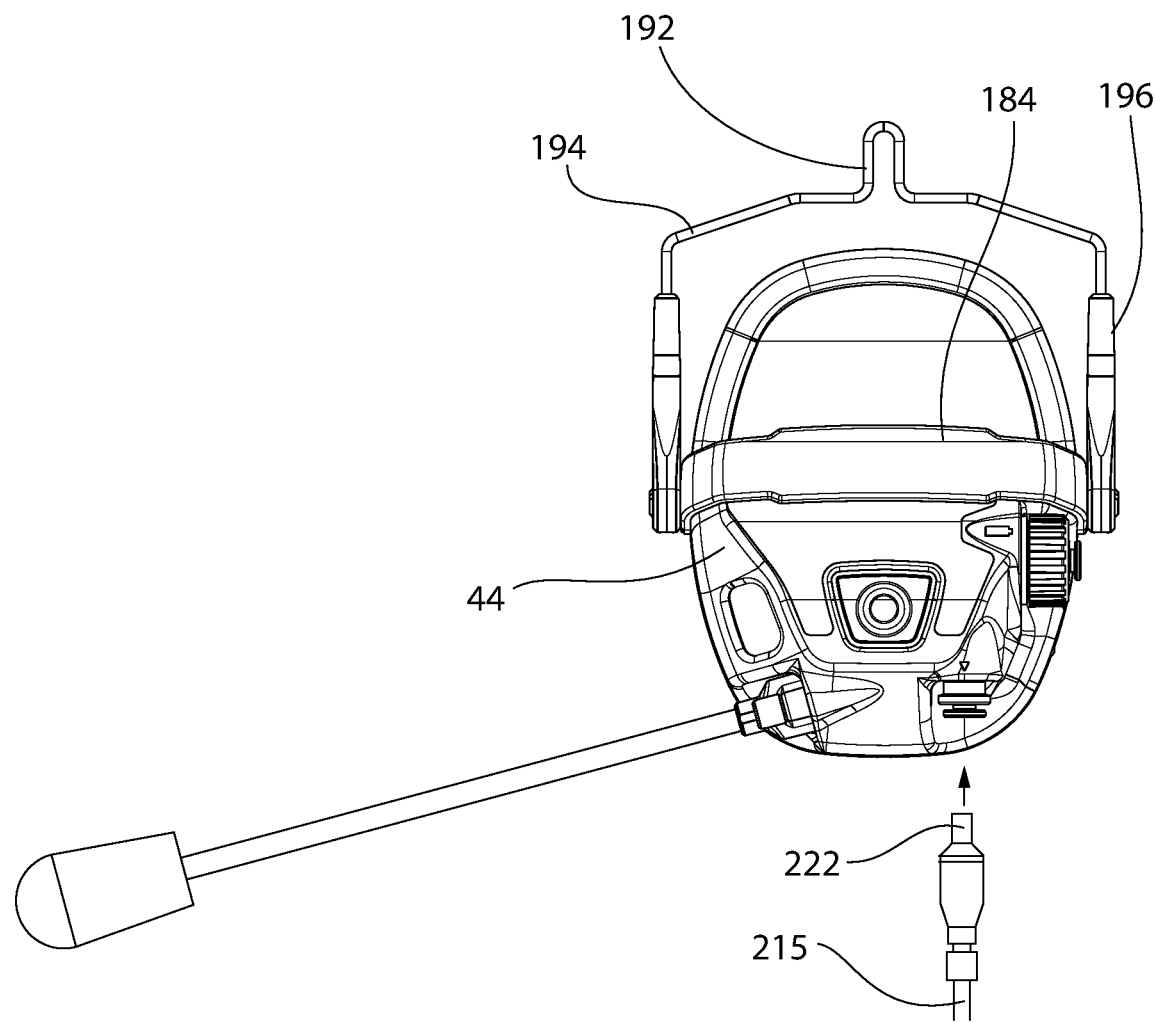
FIG. 41 is a left-side elevational view of the accessory coupling system of FIG. 34 with some elements removed.

Referring to FIG. 41, the ear cup 44 may be electrically coupled to a device (not shown but could be, e.g., a push to talk device) by a wire 215. The wire 215 may include a connection 222 configured to be detachably coupled to the ear cup 44. The connection 222 may provide electrical communication between the wire 214 and any electronics within the ear cup 44. The connection may be any connector such as a 3.5 mm jack, USB connector, B6 connector or a 10 pin connector (e.g., a Fischer UltiMate 70 series connector). The connection 222 may allow a download cable to be replaced as necessary rather than replacing an entire communication system. When two ear cups 44 are coupled to the helmet 46 or headband 182, a user may selectively disengage the wire 215 from one of the ear cups 44 and couple the wire 215 to the other of the ear cups 44.

Figure 42:
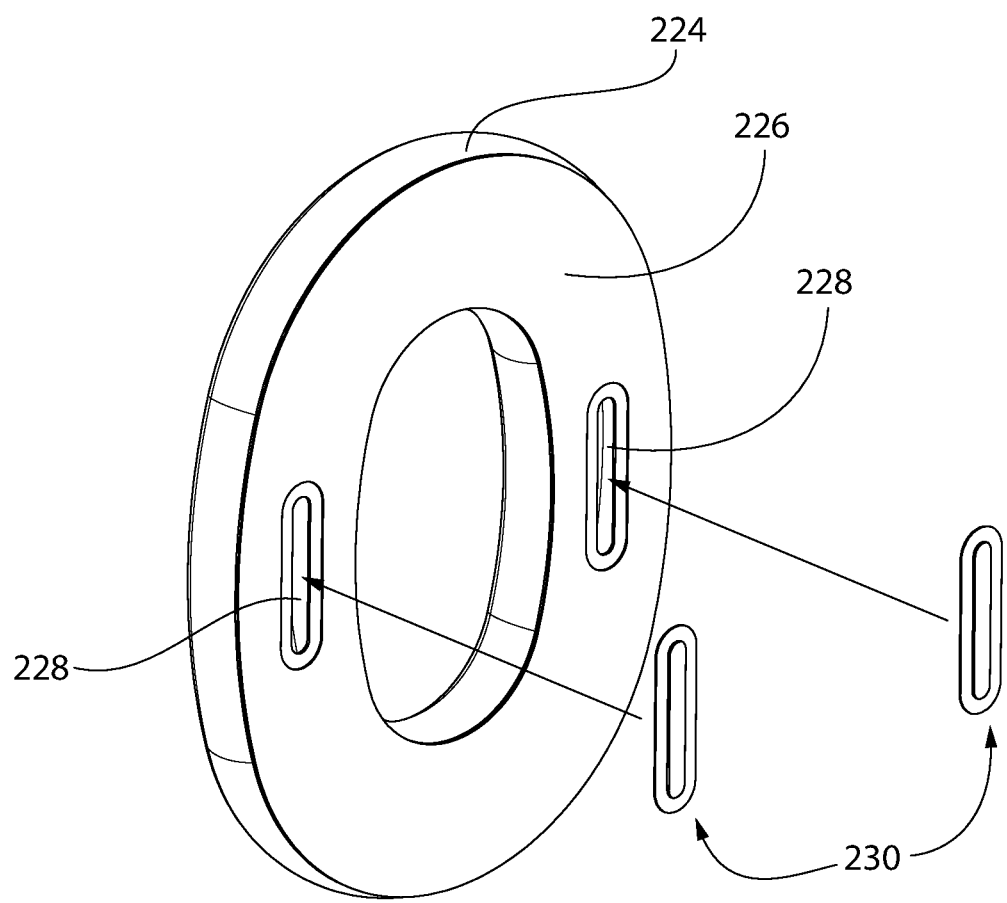
FIG. 42 is a front, right-side perspective view of the ear pad of FIG. 1.

Referring to FIGS. 1 and 42, the ear cup 44 may include an ear pad 224. Existing ear pads may include foam to provide optimum sound reduction. However, existing ear pads may absorb liquid (e.g., from the environment or perspiration) which can lead to degradation in hearing protection or cause unsanitary conditions within the ear pad. The ear pad 224 may include a liquid barrier jacket 226 (FIG. 42) that prevents liquid or air from passing therethrough. The ear pad 224 may include passages 228 configured to allow air to enter into the ear pad 224. A membrane 230 may seal the passages 228. The membrane 230 may be waterproof. The membrane 230 may be manufactured from a material that is waterproof and breathable (e.g., polytetrafluoroethylene) such that water or liquid cannot pass through the membrane but air can pass therethrough. The size of the passage 228 and membrane 230 may be selected to allow a desired airflow rate through the membrane 230 to provide proper performance of the ear cup 44. In some embodiments, the membrane 230 may comprise the entire jacket 226.

A kit may be provided such that a user may attach the accessory coupling system 40 to an existing helmet system. The kit may include the accessory coupling system 40 and the ear cup 44. The kit may include accessory coupling system 40, mounting rail 48, and ear cup 44. The kit may include one or more of accessory coupling system 40, mounting rail 48, accessory coupling system 180, and ear cup 44. In some embodiments, a kit includes two or more of the ear cup 44, attachment arm 60, harness 62, headband 182, and cover 212.

A method of attaching the ear cup 44 to a helmet 46 may include coupling accessory coupling system 40 to a rail 48 on the helmet 46. The method may include coupling the rail 48 to the helmet 46 using preexisting holes in the helmet 46 before coupling the accessory coupling system 40 to the rail 48. The method may include engaging the latch 64 and moving the connector 54 relative to the rail 48 to a desired position. The method may include electrically connecting the ear cup 44 to at least one of another ear cup 44 and a communication device (e.g., a push to talk button). The method may include detaching the ear cup 44 from accessory coupling system 180 and coupling the ear cup 44 to accessory coupling system 40. The accessory coupling system 40 may be coupled to the helmet 46 before the ear cup 44 is coupled to the accessory coupling system 40.

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and various features of the disclosed embodiments may be combined. The words "right", "left", "lower" and "upper" designate directions in the drawings to which reference is made. The words "inwardly" and "outwardly" refer to directions toward and away from, respectively, the geometric center of the accessory coupling system. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

We claim:

1. A communication accessory comprising:
   an ear cup configured to at least one of send and receive an audio communication, the ear cup being detachably coupleable to a first accessory coupling system configured to couple to a helmet, and a second accessory coupling system configured to couple to a headband; and
   a harness coupled to the ear cup and extending across a front surface of the ear cup, the harness detachably coupling the ear cup to the first accessory coupling system and the second accessory coupling system.

2. The communication accessory of claim 1, wherein the ear cup detachably couples and decouples from the first accessory coupling system and the second accessory coupling system without tools.

3. The communication accessory of claim 1, wherein the ear cup includes a pair of indents on diametrically opposed sides of the ear cup.

4. The communication accessory of claim 1, wherein the ear cup includes a pair of indents on diametrically opposed sides of the ear cup and the harness includes protrusions positionable in the pair of indents.

5. The communication accessory of claim 1, wherein the harness is fixed relative to the front surface of the ear cup.

6. The communication accessory of claim 1 further comprising:
   an electrical connector wire electrically coupled to the ear cup,
   wherein the harness is detachable from the ear cup while the electrical connector wire remains electrically coupled to the ear cup.

7. The communication accessory of claim 1 further comprising:
   the first accessory coupling system, wherein the first accessory coupling system is configured to detachably couple the ear cup to a mounting feature on an exterior of the helmet.

8. The communication accessory of claim 7, wherein the first accessory coupling system comprises:
   a connector configured to moveably couple to the mounting feature;
   a base coupled to the connector, the base configured to rotate about a first axis relative to the connector between a use position and a storage position, the base configured to prevent movement of the connector when the base is in the use position and allow movement of the connector when the base is rotated out of the use position;
   an attachment arm coupled to the base, the attachment arm configured to rotate about a second axis relative to the base; and
   a biasing member configured to bias the attachment arm about the second axis; and
   a harness coupled to the attachment arm, the harness configured to detachably couple to the ear cup.

9. The communication accessory of claim 8 further comprising:
   an intermediate member coupled to the base, the intermediate member including a channel configured to movably receive a portion of the attachment arm,
   wherein movement of the attachment arm within the channel relative to the intermediate member changes a distance between the ear cup and the base.

10. The communication accessory of claim 9, wherein one of the attachment arm and the intermediate member includes a recess and the other of the attachment arm and the intermediate member includes a protrusion configured to be positioned in the recess to at least temporarily fix a position of the intermediate member relative to the attachment arm.

11. The communication accessory of claim 9, wherein the base includes a first flange and a second flange, and
    wherein the intermediate member is coupled to the base between the first flange and the second flange.

12. The communication accessory of claim 11, wherein at least one of the first flange and the second flange includes a boss configured to limit rotation of the intermediate member relative to the base.

13. The communication accessory of claim 8, wherein the connector includes a protrusion configured to be positioned in a recess of the mounting feature thereby fixing a position of the connector relative to the mounting feature.

14. The communication accessory of claim 13, wherein the connector includes a latch and the protrusion is spring biased into the recess by the latch,
    wherein movement of the latch disengages the protrusion from the recess, and
    wherein the base prevents movement of the latch when the base is in the use position.

15. The communication accessory of claim 8, wherein the harness is rotatable about a third axis relative to the attachment arm, the third axis being transverse to at least one of the first axis and the second axis.

16. The communication accessory of claim 8 further comprising: the mounting feature coupled to the connector.

17. The communication accessory of claim 16, wherein the mounting feature includes a dovetail channel with at least a portion of the dovetail channel positioned on the helmet behind a wearer's ear, and
    wherein the connector includes a dovetail shape configured to mount in the dovetail channel.

18. The communication accessory of claim 7, wherein the second accessory coupling system comprises:
    the headband, wherein the headband is configured to extend from a first side of a wearer's head to a second side of a wearer's head;
    a cover detachably coupled to the headband;
    a frame rotatably coupled to the headband; and
    a harness rotatably coupled to the frame and configured to detachably couple to the ear cup.

19. The communication accessory of claim 18, wherein the second accessory coupling system further comprises a sleeve coupled to the harness, the sleeve including a pocket to receive at least a portion of the frame.

20. The communication accessory of claim 19, wherein the sleeve is rotatable relative to the frame.

21. The communication accessory of claim 1, wherein the ear cup includes an ear cup pad having a liquid proof barrier and a membrane in an opening of the liquid proof barrier, the membrane configured to allow gas flow through the membrane and configured to prevent liquid flow through the membrane.

22. A communication accessory comprising:
    an ear cup configured to at least one of send and receive an audio communication, the ear cup detachably coupleable to a first accessory coupling system and a second accessory coupling system;
    wherein the first accessory coupling system comprises:
    a connector configured to couple to a mounting feature on a helmet;
    a base coupled to the connector, the base configured to rotate about a first axis relative to the connector between a use position and a storage position;

an attachment arm coupled to the base, the attachment arm configured to rotate about a second axis relative to the base; and a harness coupled to the attachment arm, the harness configured to detachably couple to the ear cup, and wherein the second accessory coupling system comprises:

a headband configured to extend from a first side of a wearer's head to a second side of a wearer's head;

a cover detachably coupled to the headband;

a frame rotatably coupled to the headband; and a harness rotatably coupled to the frame, the harness configured to detachably couple to the ear cup.

23. A communication accessory comprising:

an ear cup configured to at least one of send and receive an audio communication, wherein the ear cup is detachably coupleable to a first accessory coupling system configured to couple to a helmet and a second accessory coupling system configured to couple to a headband, and wherein the ear cup includes an ear cup pad having a liquid proof barrier and a membrane in an opening of the liquid proof barrier, the membrane configured to allow gas flow through the membrane and configured to prevent liquid flow through the membrane.

* * * * *